United States Patent [19]
Van De Kerkhof

[11] Patent Number: 5,850,418
[45] Date of Patent: Dec. 15, 1998

[54] ENCODING SYSTEM AND ENCODING METHOD FOR ENCODING A DIGITAL SIGNAL HAVING AT LEAST A FIRST AND A SECOND DIGITAL COMPONENT

[75] Inventor: Leon M. Van De Kerkhof, Eindhoven, Netherlands

[73] Assignee: U.S. Philips Corporation, New York, N.Y.

[21] Appl. No.: 431,867

[22] Filed: May 1, 1995

[30] Foreign Application Priority Data

May 2, 1994 [EP] European Pat. Off. .............. 94201214

[51] Int. Cl.$^6$ ...................................................... H04B 1/66
[52] U.S. Cl. ......................... 375/240; 704/500; 704/501; 704/504
[58] Field of Search .................................. 375/240, 246; 704/500, 504, 229

[56] References Cited

U.S. PATENT DOCUMENTS

| | | |
|---|---|---|
| 4,703,480 | 10/1987 | Westall et al. ........................... 370/111 |
| 4,941,152 | 7/1990 | Medan ....................................... 375/27 |

(List continued on next page.)

FOREIGN PATENT DOCUMENTS

| | | |
|---|---|---|
| 0289080A1 | 11/1988 | European Pat. Off. . |
| 0400755A1 | 12/1990 | European Pat. Off. . |
| 0402973A1 | 12/1990 | European Pat. Off. . |
| 0457390A1 | 11/1991 | European Pat. Off. . |
| 0457391A1 | 11/1991 | European Pat. Off. . |
| 0497413A1 | 8/1992 | European Pat. Off. . |

OTHER PUBLICATIONS

ICASSP 91, vol. 5, Spectral Estimation Audio and Electroacoustics, 1991 Int'l Conference on Acoustics, Speech, and Signal Processing, May 14–17, 1991, Totonto, Canada, Robbert G. Van Der Waal, Raymond N.J. Veldhuis, "Subband Coding of Stereophonic Digital Audio Signals", pp. 3601–3604, IEEE.

(List continued on next page.)

Primary Examiner—Stephen Chin
Assistant Examiner—Mohammad J Ghayour
Attorney, Agent, or Firm—Michael E. Belk

[57] ABSTRACT

An encoding system and an encoding method for encoding a digital signal having at least a first and a second digital signal component. The encoding system includes a splitter unit for dividing the bandwidth of the digital signal components into M successive frequency bands, and generating in response to the digital signal components M sub signals ($SB_{m1}$, $SB_{mr}$) for each digital signal component, each sub signal of a signal component being associated with one of the frequency bands (m); a bit need determining unit for determining bit needs for time equivalent signal blocks of the sub signals, a signal combination unit for combining, in a number of at least one frequency bands, time equivalent signal blocks of corresponding sub signals of the at least first and second signal component so as to obtain a time equivalent signal block of a composite sub signal in each the at least one frequency bands; quantizing unit for quantizing time equivalent signal blocks of the sub signals in those frequency bands in which no composite sub signal is available and for quantizing the corresponding time equivalent signal blocks of the composite sub signal in the at least one frequency bands in which a composite sub signal is available. Further, a bit allocation unit is available for deriving allocation information ($n_{mi}$, $n_{jc}$) from bit needs obtained in the bit need determining unit and from a value B, where B corresponds to a number of bits in an available bitpool. The bit need determining unit is adapted to determine a common bit need $b_{mc}$ for a time equivalent signal block of a composite sub signal $SB_{mc}$ in a frequency band m from the bit needs $b_{mi}$ of the time equivalent signal blocks of the corresponding sub signals of the at least two signal components in that frequency band from which the time equivalent signal block of the composite sub signal has been derived, by taking the common bit need $b_{mc}$ equal to a weighted sum of the bit needs $b_{mi}$. The encoding system can be a subband encoding system or a transform encoding system.

43 Claims, 8 Drawing Sheets

U.S. PATENT DOCUMENTS

| | | | |
|---|---|---|---|
| 5,157,760 | 10/1992 | Akagiri | 395/2 |
| 5,214,678 | 5/1993 | Rault et al. | 375/122 |
| 5,299,239 | 3/1994 | Iwahashi et al. | 375/122 |
| 5,299,240 | 3/1994 | Iwahashi et al. | 375/122 |
| 5,311,561 | 5/1994 | Akagiri | 375/122 |
| 5,490,170 | 2/1996 | Akagiri et al. | 375/240 |
| 5,627,937 | 5/1997 | Kim | 395/2.38 |
| 5,654,952 | 8/1997 | Suzuki et al. | 369/124 |
| 5,661,755 | 8/1997 | Van De Kerkhof et al. | 375/242 |
| 5,675,610 | 10/1997 | Chinen | 375/260 |

OTHER PUBLICATIONS

ICASSP 80, Proceedings, Apr. 9–11, 1980, Denver Colorado, vol. 2 of 3, IEEE Int'l Conference on Acoustics, Speech and Signal Processing, Michael E. Krasner, "The Critical Band Coder– Digital Encoding of Speech Signals Based on the Perceptual Requirements of the Auditory System", pp. 327–331.

FIG. 1a

ENCODING SYSTEM AND ENCODING METHOD FOR ENCODING A DIGITAL SIGNAL HAVING AT LEAST A FIRST AND A SECOND DIGITAL COMPONENT

BACKGROUND OF THE INVENTION

The invention relates to an encoding system for encoding a digital signal having at least a first and a second digital signal component, the signal components having a specific sampling frequency and bandwidth, comprising splitter means for dividing the bandwidth of the digital signal components into M successive frequency bands, and generating in response to the digital signal components M sub signals for each digital signal component, each sub signal of a signal component being associated with one of the frequency bands, bit need determining means for determining bit needs for time equivalent signal blocks of the sub signals, the signal blocks each containing q samples of a sub signal, a bit need $b_{mi}$ for a signal block of a sub signal $SB_{mi}$ of a signal component i in frequency band m corresponding to the number of bits by which the q samples in that signal block should be represented, where $b_{mi}$ may vary for different signal blocks and different sub signals, signal combination means for combining, in a number of at least one frequency bands, time equivalent signal blocks of corresponding sub signals of the at least first and second signal component so as to obtain a time equivalent signal block of a composite sub signal in each said at least one frequency bands, quantizing means for quantizing time equivalent signal blocks of the sub signals in those frequency bands in which no composite sub signal is available and for quantizing the corresponding time equivalent signal blocks of the composite sub signal in said at least one frequency band in which a composite sub signal is available, each sample of the signal block of a sub signal $SB_{mi}$ being quantized by $n_{mi}$ bits, where m denotes a frequency band in which no composite sub signal is available, and each sample of the composite sub signal $SB_{mc}$ being quantized by $n_{mc}$ bits, where m denotes a frequency band in which a composite sub signal is available, bit allocation means for deriving the variables $n_{mi}$ and $n_{mc}$ from bit needs obtained in the bit need determining means and from a value B, where B corresponds to a number of bits in an available bitpool, and wherein q is an integer larger than zero, $n_{mi}$, $n_{mc}$, $b_{mi}$, $b_{mc}$ are variables where $n_{mi}$ and $n_{mc}$ are greater than or equal to zero, M is a constant greater than zero, B is an integer, and m is an integer such that $1 \leq m \leq M$, and to an encoding method for encoding the digital signal. An encoding system as given in the opening paragraph is known from EP 457,390 A1 and EP 457,391 A1, the documents (6a) and (6b) respectively in the list of related documents.

The prior art documents disclose an encoding system in which a digital signal, such as a stereo audio signal can be encoded into a data reduced digital audio signal. Both signal components, the left and right hand signal components of the stereo audio signal, are encoded separately.

The splitter means in the prior art encoding systems have been disclosed as splitter means for dividing the bandwidth of the digital signal components into a number of sub signals which are called subband signals. The frequency ranges in such an encoding system are called subbands. Such an encoding is called subband encoding.

It should however be noted that the invention is not limited to such subband encoding. Also other kinds of encoding systems, such as a transform encoding system, in which a transform encoding is carried out on the digital signal, is possible. Such transform encoding results in a number of transform coefficients, each transform coefficient corresponding to a certain frequency range. As a consequence q=1 in that case.

In the following, however, a discussion will be given on the basis of a subband encoding system.

EP 402,973, document (2) in the list of related documents, discloses the possibility that an intensity stereo encoding can be carried out on the at least two subband signal components in a subband, in order to obtain an increased data reduction on the digital signal to be encoded. This can be necessary if the transmission channel via which the data reduced information should be transmitted has a too small bandwidth.

Another document relating to a switching over to an intensity stereo mode is document (7) in the list of related documents.

SUMMARY OF THE INVENTION

The invention aims at providing an encoding system in which an intensity stereo encoding can be realized. The encoding system in accordance with the invention is characterized in that the bit need determining means is adapted to determine a common bit need $b_{mc}$ for a time equivalent signal block of a composite sub signal $SB_{mc}$ in a frequency band m from the bit needs $b_{mi}$ of the time equivalent signal blocks of the corresponding Sub signals of the at least two signal components in that frequency band from which the time equivalent signal block of the composite sub signal has been derived, such that common bit need $b_{mc}$ is equal to the sum of the bit needs $b_{mi}$, multiplied by a corresponding weighting factor, the bit allocation means being adapted to derive the variables $n_{mi}$ for the time equivalent signal blocks of the sub signals in those frequency bands in which no composite sub signal is available and the at least one, variable $n_{mc}$ for the time equivalent signal block of the sub signal in those at least one frequency band for which a composite sub signal is available, from the bit needs $b_{mi}$ available for those frequency bands for which no composite sub signal is available and the at least one common bit need $b_{mc}$.

More specifically, the weighting factor corresponding to the largest of the bitneeds $b_{mi}$ is larger than the weighting factor corresponding to the other at least one bitneed, or that the weighting factor corresponding to the largest of the bitneeds $b_{mi}$ is equal to one and the other at least one weighting factor is zero.

The invention is based on the following recognition. The prior art available, in which the option of intensity-stereo is disclosed, remains silent about how such an intensity-stereo mode can be realized and how it should be implemented. More specifically, it is unknown how the bitneeds $b_{mc}$ for a composite subband signal in a subband should be determined.

In accordance with the invention, if for a certain subband it is decided that the at least two signal components in the subband should be combined, the bit need $b_{mc}$ for the composite subband signal in the subband $SB_m$ is determined by taking $b_{mc}$ equal to the largest of the at least two $b_{mi}$ values corresponding to the at least two signal components in said subband. By taking $b_{mc}$ equal to the a weighted sum of the at least two $b_{mi}$ values, it has been ascertained that encoding the composite signal assures the correct quantization of the composite signal in the quantization means.

Further, it is unknown from the prior art documents how the decision process is realized to decide between an encoding in a full stereo mode in which a fully separate encoding of the at least two subband signal components in the various M subbands is carried out, and an encoding in an intensity-stereo mode in which an encoding of a composite signal in $x_1$ subbands is carried out and a separate encoding is carried out in the remaining $M-x_1$ subbands.

To realize this, the encoding system is characterized in that it comprises computation means for computing a value $B_0$, where $B_0$ corresponds to the number of bits required when separately encoding the time equivalent signal blocks of the at least first and second sub signals in all M frequency bands, comparing means for comparing the value $B_0$ with the value B, the comparing means being adapted to generate a first control signal at an output when $B_0$ exceeds B, combining control signal generator means for generating a first combining control signal in response to at least the occurrence of the first control signal, the signal combination means being adapted to combine in a number of $x_1$ frequency bands, time equivalent signal blocks of corresponding sub signals of the at least first and second signal component in said $x_1$ frequency bands so as to obtain a time equivalent signal block of a composite sub signal in each said $x_1$ frequency bands, in response to said first combining control signal, the bit allocation means being adapted to derive variables $n_{jc}$ for the time equivalent signal blocks of the composite sub signals in said $x_1$ frequency bands, in response to the first combining control signal, where j denotes one of the $x_1$ frequency bands, the quantizing means being adapted to quantize the time equivalent signal blocks of the composite sub signals in said $x_1$ frequency bands by $n_{jc}$ bits, in response to the first combining control signal, and where $x_1$ is an integer larger than zero.

From the foregoing, it is clear that a calculation is carried out to determine whether the number of bits available in the bitpool for the encoding process suffices for an encoding in the full stereo mode. If it is concluded that it is not, it may be decided to encode the digital signal components in a number of $x_1$ subbands in an intensity stereo mode. One or more of a number of requirements can be used to decide when an intensity stereo mode encoding should be carried out or not in the said $x_1$ subbands. In one embodiment, the number of bits $B_1$ is calculated that are required when an encoding in an intensity stereo mode is carried out, such that in $x_1$ subbands the at least two signal components in a subband are combined. If $B_1$ does not exceed B, it can be decided to carry out an encoding in the said intensity-stereo mode in the said $x_1$ subbands.

In another embodiment, the encoding system is further characterized in that the computation means further being adapted to determine the difference $D_1$ between $B_0$ and $B_1$, the comparing means being adapted to compare the difference $D_1$ with a first threshold value $T_1$, the comparing means being adapted to generate a third control signal when the difference $D_1$ exceeds the first threshold value, the combining control signal generator means being further adapted to generate said first combining control signal in response to at least the occurrence of the first and third control signal.

This offers the possibility to decide, in the case where $B_0$ exceeds B and $B_1$ does nor exceed B, not to carry out an intensity stereo encoding in the said $x_1$ subbands. One could then decide to carry out an encoding in a full stereo mode, although the bitpool is insufficient for such an encoding in a full stereo mode. The reason for not going over to an intensity stereo encoding mode in the said $x_1$ subbands is, that the 'profit' when going over to an intensity stereo mode in $x_1$ subbands is too low. The reason for such choice is that artifacts that can occur because of carrying out an intensity stereo mode in the $x_1$ subbands can become more audible than the higher quantisation noise because of the fact that too less bits are allocated to the various subband signals in the full stereo mode.

Further, the encoding system is preferably characterized in that the encoding system further comprises antiphase determining means for determining an antiphase situation between the corresponding time equivalent signal blocks in at least one of said $x_1$ frequency bands and for determining a fourth control signal in the absence of an antiphase situation in at least one of the $x_1$ subbands, the combining control signal generator means being further adapted to generate said first combining control signal in response to at least the occurrence of the first and fourth control signal.

Antiphase situations occurring during subband encoding have already been described in EP 497,413 A1, document (3) in the list of related documents. Encoding two subband signal components in a subband that are in antiphase with each other, in an intensity stereo mode can result in an incorrect encoding of the signal components, which results in large distortion components occurring in the replicas of the two signal components upon decoding. Therefore, if such antiphase situation occurs in one or more of the $x_1$ subbands, it is decided not to carry out an intensity stereo encoding in the said $x_1$ subbands, resulting in the full stereo encoding to be carried out in the said $x_1$ subbands.

The decision to go over to an intensity stereo mode encoding in the $x_1$ subbands can thus be determined by one or more of the above discussed requirements.

The encoding system may be further characterized in that in response to a second combining control signal the signal combination means is further adapted to combine, in a number of $x_2$ frequency bands, time equivalent signal blocks of corresponding sub signals of the at least first and second signal component in said $x_2$ frequency bands so as to obtain a time equivalent signal block of a composite sub signal in each said $x_2$ frequency bands, the bit allocation means being adapted to derive variables $n_{jc}$ for the time equivalent signal blocks of the composite sub signals in said $x_2$ frequency bands, in response to the second combining control signal, where j denotes one of the $x_2$ frequency bands, the quantizing means being adapted to quantize the time equivalent signal blocks of the composite sub signals in said $x_2$ frequency bands by $n_{jc}$ bits, in response to the second combining control signal, that the combining control signal generator means being further adapted to generate said second combining control signal in response to at least the detection of the absence of the second control signal, where $x_2$ is an integer larger than zero.

From the foregoing, it is clear that a calculation is carried out to determine whether the number of bits available in the bitpool for the encoding process suffices for an encoding in an intensity stereo mode in $x_1$ of the M subbands. If it is concluded that it is not, it is calculated how many bits are required when an encoding in an intensity stereo mode is carried out, such that in $x_2$ subbands the at least two signal components in a subband are combined. The $x_2$ subbands can include the $x_1$ subbands, or can be different subbands. If $B_2$ does not exceed B, it can be decided to carry out an encoding in the said intensity-stereo mode in the $x_2$ subbands.

One or more of the requirements discussed above can also be used for the decision to go over into an intensity stereo mode encoding in the $x_2$ subbands.

Preferably, the $x_1$ subbands are the $x_1$ highest subbands. This for the reason that the phase sensitivity of the ear is smaller for higher frequencies.

The claims 24 to 43 are the subject of the encoding method for encoding the digital signal into an intensity stereo encoding mode in one or more of the subbands.

BRIEF DESCRIPTION OF THE DRAWINGS

These and other aspects of the invention will be further explained with reference to the following drawings, in which:

FIG. 1a shows subsequent time equivalent signal blocks of 2M subband signals present in the M subbands, when encoding the digital signal in a full stereo mode;

DESCRIPTION OF THE PREFERRED EMBODIMENTS

Figure 1:
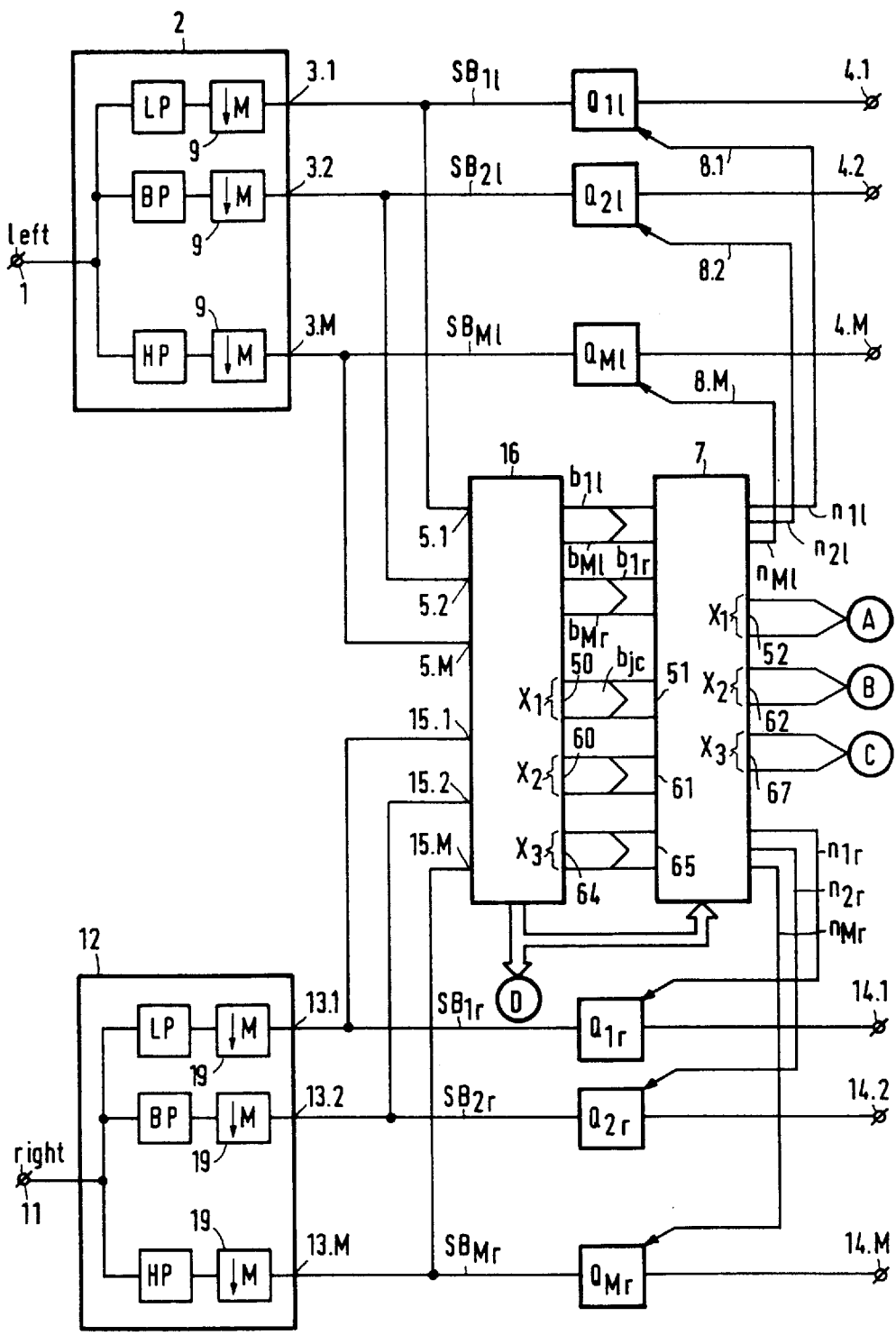
FIG. 1 shows part of an encoding system for encoding a stereo audio digital signal.

FIG. 1 shows an embodiment of the encoding system for coding a stereo audio signal. For example, samples of 16 bit or more of the left signal component of the audio signal are applied to input 1 with a sampling frequency of 44.1 kHz. The audio signal is applied to a subband splitter 2. The subband splitter 2 splits up the left audio signal component into M subband signals by means of a number of M filters, that is to say, a low-pass filter LP, M-2 band-pass filters BP and a high-pass filter HP. For example, M is equal to 32. The sampling frequency of the M left subband signal components is reduced in the blocks referenced 9. In these blocks the sampling frequency is reduced by a factor of M. The signals thus obtained are presented at the outputs 3.1, 3.2, ... 3.M. At the output 3.1 the subband signal $SB_{11}$ is presented, which is the subband signal present in the lowest subband, which is the subband with the index m=1. At the output 3.2 the subband signal $SB_{21}$ is presented in the lowest but one subband, which is the subband with the index m=2. At the output 3.M the subband signal $SB_{M1}$ is available, which is the subband signal present in the highest subband, which has the index m=M. The signals at the outputs 3.1 to 3.M have the form of successive samples expressed in 16 or over, for example 24-bit numbers. The samples of the left subband signal component thus appear at the outputs 3.1 to 3.M in FIG. 1. These samples are referenced $l[k]$.

16-bit samples of the right signal component of the audio signal are presented with a 44 Khz sampling frequency at input 11. The signal is applied to a subband splitter 12 which distributes the right audio signal component over M subbands by means of M filters which are identical with the filters in the splitter 2 as regards their filtering function. Subsequently, the sampling frequency of the M right subband signal components is reduced in the blocks referenced 19. The signals thus obtained are presented at the outputs 13.1 to 13.M. At the output 13.1 there is again available the subband signal $SB_{1r}$ from the lowest subband with index m=1, and at the output 13.M the subband signal $SB_{Mr}$ from the highest subband is available. The signals are also in the form of samples having identical numbers of bits with the signals presented at the outputs 3.1 to 3.M of the splitter 2. The samples are referenced $r[k]$.

Figure 1A:
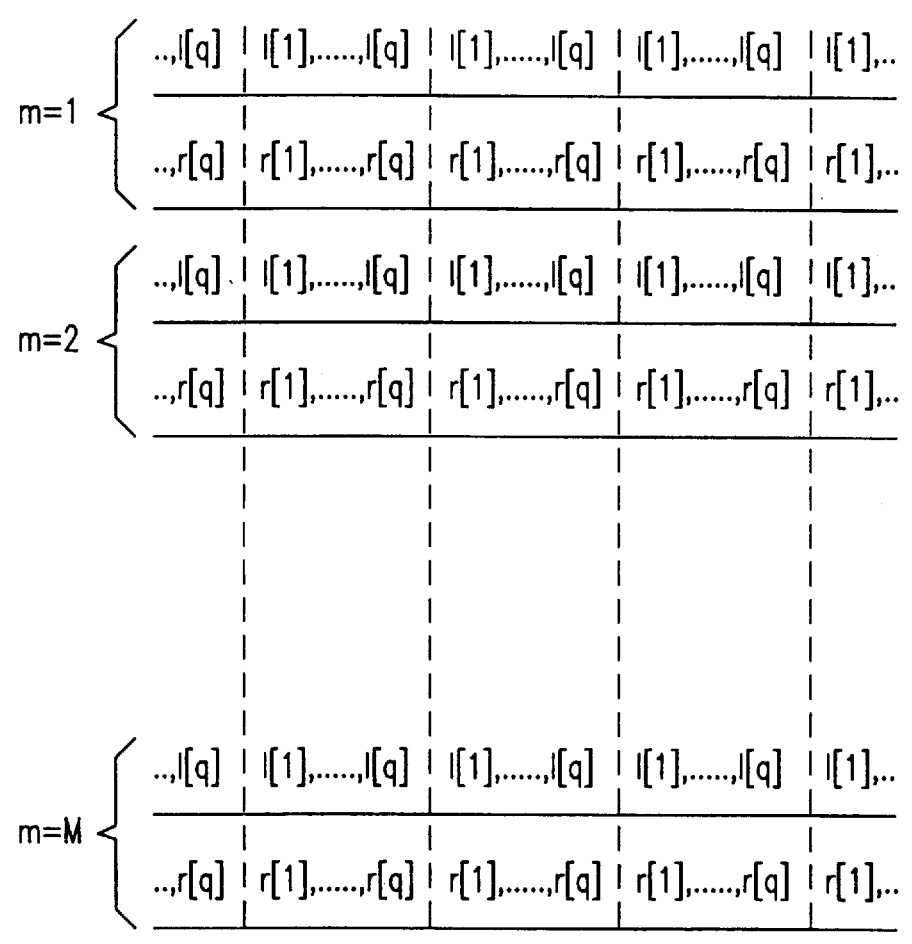

FIG. 1a shows the two signal components in each subband plotted against time. The signal stream of the successive samples in the two signal components in each subband are combined to q-sample signal blocks of as is apparent from FIG. 1a. For example, q is equal to 12.

In the present embodiment the subbands having the indices m=1 to m=M have all identical widths. This is not necessary, however. The prior-art publication (4), Krasner, discusses, for example, a subdivision into a number of subbands whose bandwidths approximately correspond to the bandwidths of the critical bands of the human auditory system in the respective frequency ranges.

The operation of the subband splitters 2 and 12 will not be further discussed, because their operation has already been extensively discussed. To this end reference be made to prior-art documents (1), (4) and (5) which are considered included in this application where deemed necessary.

The corresponding signal blocks of q successive samples of the left subband signal components are applied to the associated quantizers $Q_{11}$ to $Q_{M1}$. In a quantizer $Q_{m1}$ the samples in a signal block are quantized to quantized samples comprising a number of bits $n_{m1}$, where $n_{m1}$ is generally smaller than 16.

Similarly, the corresponding signal blocks of the right subband signal components are applied to the associated quantizers $Q_{1r}$ to $Q_{Mr}$. In a quantizer $Q_{mr}$ the samples in a signal block are quantized to quantized samples comprising a number of bits $n_{mr}$, where $n_{mr}$ is generally smaller than 16.

Prior to quantization, the q samples in a signal block are first normalized. This normalization is effected by dividing the amplitudes of the q samples by the amplitude of the sample having the largest absolute value in the signal block. The amplitude of the sample having the largest amplitude in the signal block provides the scale factor SF, cf. document (2). Subsequently, the amplitudes of the normalized samples, which are now situated in an amplitude range from −1 to +1, are quantized.

In prior-art document (2) this quantization is extensively discussed, cf. FIGS. 24, 25 and 26 and the associated descriptions in that document.

The quantized samples of the left signal components in the M subbands are thereafter presented at the respective outputs 4.1 to 4.M. The quantized samples of the right signal components in the M subbands are presented at the respective outputs 14.1 to 14.M.

The outputs 3.1 to 3.M are further coupled to the respective inputs 5.1 to 5.M of the unit 16 which function as the bit need determining means. Furthermore, the outputs 13.1 to 13.M are coupled to the respective inputs 15.1 to 15.M of the unit 16. The unit 16 determines the bit needs $b_{m1}$ and $b_{mr}$ for q-sample signal blocks corresponding with time of the left and right subband signal components in the M subbands. The bit needs $b_{m1}$ and $b_{mr}$ are numbers related to the number of bits with which the q samples in a q-sample signal block of the left and right signal components in a subband with index m ought to be quantized.

The bit needs $b_{11}$ to $b_{M1}$, and $b_{1r}$ to $b_{Mr}$ derived by the bit need determining means 16 are applied to the bit allocation means 7. The bit allocation means 7 determine, on the basis of the bit needs, the real numbers of bits $n_{11}$ to $n_{M1}$ and $n_{1r}$ to $n_{Mr}$ with which the q samples of the corresponding signal blocks of the left and right subband signal components in the subbands m=1 to m=M are quantized. Control signals corresponding to the numbers $n_{11}$ to $n_{M1}$ are applied to the respective quantizers $Q_{11}$ to $Q_{M1}$ over the lines 8.1 to 8.M, so that the quantizers are capable of quantizing the samples of the left signal components with the correct numbers of bits. Control signals corresponding to the numbers of $n_{1r}$ to $n_{Mr}$ are applied to associated quantizers $Q_{1r}$ to $Q_{Mr}$ over the lines 18.1 to 18.M, so that also these quantizers are capable of quantizing the samples of the right signal components with the correct numbers of bits.

The documents (6a) and (6b) of the list of references extensively discuss how the bit need determining means 16 and the bit allocation means 7 may function.

The documents (6a) and (6b) explain how the powers $v_{m1}$ and the magnitudes $w_{m1}$ may be derived from the samples in the corresponding signal blocks of he left subband signal components, and how the bit needs $b_{m1}$ may be derived from the magnitudes $w_{m1}$ and the scale factors $SF_{m1}$. The magnitude $w_{m1}$ then represents the power of the masked quantization noise in a signal block of the left subband signal component in the subband $SB_m$. Similarly, the unit 16 derives the powers $v_{mr}$ and the magnitudes $w_{mr}$ from the samples in the corresponding signal blocks of the right subband signal components, and the bit needs $b_{mr}$ from the magnitudes $w_{mr}$ and the scale factors $SF_{mr}$. The magnitude $w_{mr}$ then represents the power of the masked quantization noise in a signal block of the right subband signal component in the subband m.

The documents then describe the bit allocation as performed in the bit allocation means 7. The bit allocation is mainly described for a mono signal. In the described bit allocation algorithm for the left signal component of the audio signal, the available number of bits B, starting from the calculated bit needs $b_{11}$ to $b_{M1}$, are distributed over the samples in the time equivalent signal blocks in the M subbands so as to obtain the magnitudes $n_{11}$ to $n_{M1}$. In the described method always the largest bit need $b_{j1}$ is determined in a number of cyclic steps, after which a number of bits p per sample are allocated to the time equivalent signal block in the subband j, which subband was the subband of the time equivalent signal block having the largest bitneed. In the event of bits being allocated to the signal block in the subband j for the first time, p is equal to, for example, 2. If bits are again allocated to the signal block in the subband j at a later stage, p will have a smaller value. For example, p will then be equal to 1.

Above documents also describe that stereo signals may be processed by the bit allocation means 7. In that case there are two options. The first option is as follows.

In this option the bit allocation is separately performed for the left and right subband signal components. In the method discussed previously, the value of B was used for the bit allocation. B was then equal to the number of available bits. It many be evident that in the present case just half the number of available bits are taken for B for the calculation of $n_{11}$ to $n_{M1}$. The other half of the number of available bits will be used for the bit allocation to the right subband signals for obtaining the values $n_{1r}$ to $n_{Mr}$.

In contradiction of the first option, in which there were separate bit allocations for the left and right subband signals, in the second option the 2M bit needs $b_{11}$ to $b_{M1}$ and $b_{1r}$ to $b_{Mr}$ are applied to a bit allocation unit similar to unit 7. In this unit the 2M numbers of $n_{11}$ to $n_{M1}$ and $n_{1r}$ to $n_{Mr}$ are derived from the real number of available bits B in a manner similar to that described in the two documents with respect to mono signals.

Figure 2:
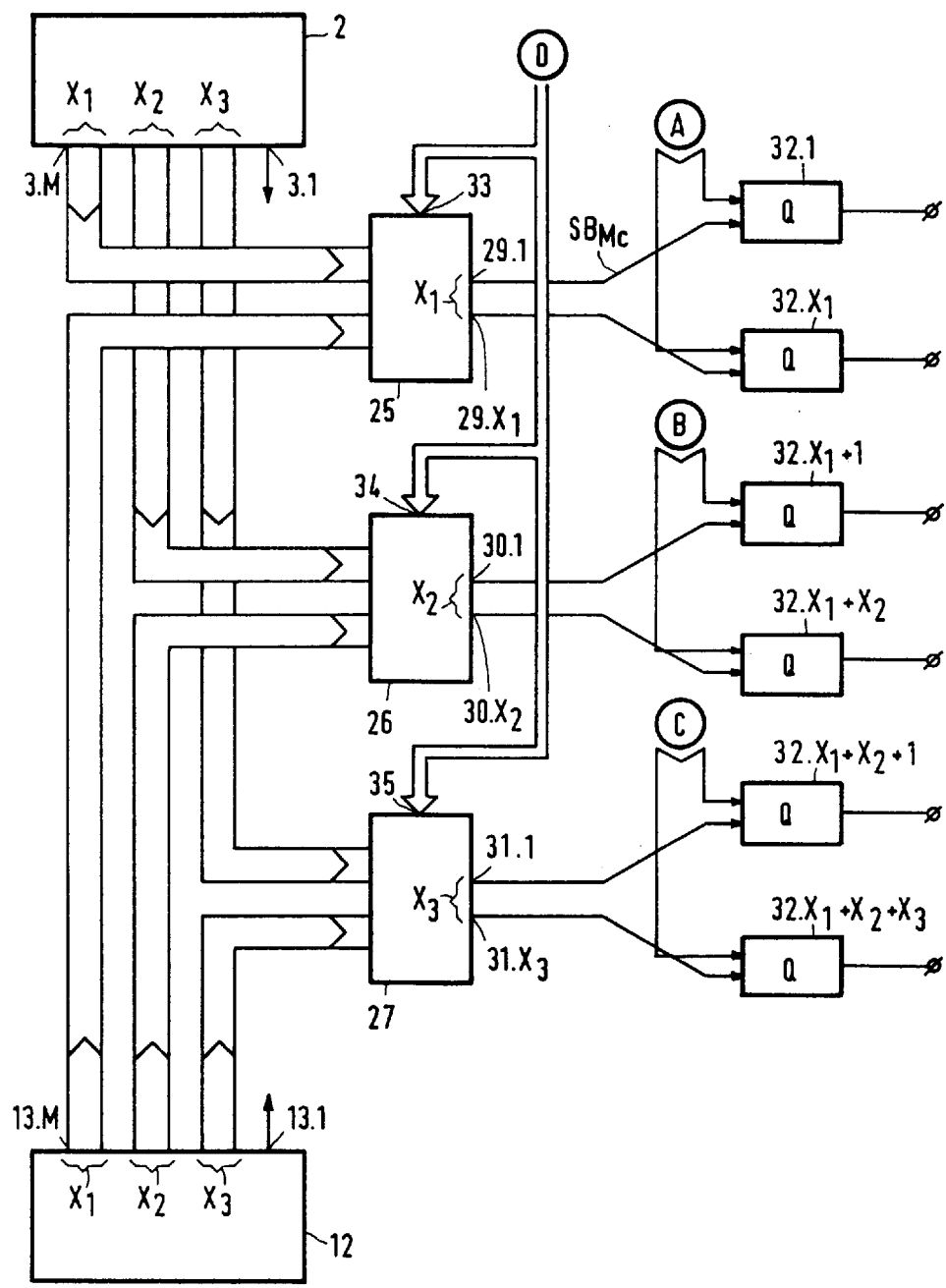
FIG. 2 shows another part of the encoding system of FIG. 1 for carrying out the encoding in an intensity stereo mode.

FIG. 2 shows the remaining circuit part of the encoding system of FIG. 1, which is the circuit part that realizes the encoding in an intensity stereo mode. FIG. 2 again shows the subband splitters 2 and 12, with their outputs 3.1 to 3.M and 13.1 and 13.M respectively for supplying the 2M subband signals.

Signal combination means are present, denoted by the reference numerals 25, 26 and 27. $x_1$ outputs of the subband splitter 2 are coupled to corresponding $x_1$ inputs of a signal combiner 25. The $x_1$ outputs of the splitter 2 are the outputs 3.M–$x_1$+1 to 3.M, on which the subband signals in the $x_1$ highest subbands of the left hand signal component are available. $x_1$ outputs of the subband splitter 12 are coupled to corresponding $x_1$ other inputs of the signal combiner 25. The $x_1$ outputs of the splitter 12 are the outputs 13.M–$x_1$+1 to 13.M, on which the subband signals in the $x_1$ highest subbands of the right hand signal component are available. The signal combiner 25 is adapted to combine time equivalent signal blocks of corresponding subband signals of the left and right hand signal component in a subband so as to obtain a time equivalent signal block of a composite subband signal in each said $x_1$ subbands.

For example, the subband signals at the outputs 3.M and 13.M of the splitters 2 and 12 respectively, are added and divided by 2, so as to obtain a composite subband signal $SB_{Mc}$ for the subband with index m=M. The subband signals at the outputs 3.M–1 and 13.M–1 are added and divided by 2, so as to obtain a composite subband signal $SB_{(M-1)c}$ for the subband with index M–1. In this way $x_1$ composite subband signals are obtained, which will be available at $x_1$ outputs of the signal combiner 25. Those outputs are denoted by 29.1 to 29.$x_1$, where the composite subband signal in the subband M is available at the output 29.1 and the composite subband signal in the subband m=M–$x_1$+1 is available at the output 29.$x_1$.

$x_2$ outputs of the subband splitter 2 are coupled to corresponding $x_2$ inputs of a signal combiner 26. The $x_2$ outputs of the splitter 2 are the outputs 3.M–$x_1$–$x_2$+1 to 3.M–$x_1$, on which the subband signals in the $x_2$ next lower subbands of the left hand signal component are available. $x_2$ outputs of the subband splitter 12 are coupled to corresponding $x_2$ other inputs of the signal combiner 26. The $x_2$ outputs of the splitter 12 are the outputs 13.M–$x_1$–$x_2$+1 to 13.M–$x_1$, on which the subband signals in the $x_2$ next lower subbands of the right hand signal component are available. The signal combiner 26 is adapted to combine time equivalent signal blocks of corresponding subband signals of the left and right hand signal component in a subband so as to obtain a time equivalent signal block of a composite subband signal in each said $x_2$ subbands, having indexes m=M–$x_1$–$x_2$+1 to m=M–$x_1$.

For example, the subband signals at corresponding outputs 3.m and 13.m of the splitters 2 and 12 respectively, are added and divided by 2, so as to obtain a composite subband signal $SB_{mc}$ for the subband with index m, where m runs from m=M–$x_1$–$x_2$+1 to m=M–$x_1$. In this way $x_2$ composite subband signals are obtained, which will be available at $x_2$ outputs of the signal combiner 26. Those outputs are denoted by 30.1 to 30.$x_2$, where the composite subband signal in the subband m=M–$x_1$ is available at the output 30.1 and the composite subband signal in the subband m=M–$x_1$–$x_2$+1 is available at the output 30.$x_2$.

$x_3$ outputs of the subband splitter 2 are coupled to corresponding $x_3$ inputs of a signal combiner 27. The $x_3$ outputs of the splitter 2 are the outputs $3.M-x_1-x_2-x_3+1$ to $3.M-x_1-x_2$, on which the subband signals in the $x_3$ again next lower subbands of the left hand signal component are available. $x_3$ outputs of the subband splitter 12 are coupled to corresponding $x_3$ other inputs of the signal combiner 27. The $x_3$ outputs of the splitter 12 are the outputs $13.M-x_1-x_2-x_3+1$ to $13.M-x_1-x_2$, on which the subband signals in the $x_3$ again next lower subbands of the right hand signal component are available. The signal combiner 27 is adapted to combine time equivalent signal blocks of corresponding subband signals of the left and right hand signal component in a subband so as to obtain a time equivalent signal block of a composite subband signal in, each said $x_3$ subbands, having indexes $m=M-x_1-x_2-x_3+1$ to $m=M-x_1-x_2$.

For example, the subband signals at corresponding outputs 3.m and 13.m of the splitters 2 and 12 respectively, are added and divided by 2, so as to obtain a composite subband signal $SB_{mc}$ for the subband with index m, where m runs from $m=M-x_1-x_2-x_3+1$ to $m=M-x_1-x_2$. In this way $x_3$ composite subband signals are obtained, which will be available at $x_3$ outputs of the signal combiner 27. Those outputs are denoted by 31.1 to $31.x_3$, where the composite subband signal in the subband $m=M-x_1-x_2$ is available at the output 31.1 and the composite subband signal in the subband $m=M-x_1-x_2-x_3+1$ is available at the output $31.x_3$.

The signal combiner 25 is controlled to combine corresponding time equivalent signal blocks in the $x_1$ highest subbands under the influence of a first control signal supplied to its control signal input 33. The signal combiner 26 is controlled to combine corresponding time equivalent signal blocks in the $x_2$ next lower subbands under the influence of a second control signal supplied to its control signal input 34. The signal combiner 27 is controlled to combine corresponding time equivalent signal blocks in the $x_3$ next lower subbands under the influence of a third control signal supplied to its control signal input 35. The control signals supplied to the signal combiners arrive via control lines denoted by the encircled D. The way in which the control signals are generated will be explained later.

The $x_1$ outputs of the signal combiner 25 are each coupled to an input of a corresponding quantizer, denoted by 32.1 to $32.x1$ respectively. In the same way, the $x_2$ outputs of the signal combiner 26 are each coupled to an input of a corresponding quantizer, denoted by $32.x1+1$ to $32.x1+x2$ respectively. In the same way, the $x_3$ outputs of the signal combiner 27 are each coupled to an input of a corresponding quantizer, denoted by $32.x1+x2+1$ to $32.x1+x2+x3$ respectively. At the outputs of the quantizers 32.1 to $32.x1+x_2+x_3$ are available the quantized versions of the composite subband signals in the subbands of index m, where m runs from M downwards to $M-x_1-x_2-x_3+1$.

In order to carry out quantization on time equivalent signal blocks of a composite subband signal in a subband m, bit allocation information in the form of an $n_{mc}$ value should be available. This bit allocation information is presented to the quantizers via the control signal lines denoted by the encircled A, for the quantizers 32.1 to $32.x1$, via the control lines denoted by the encircled B, for the quantizers $32.x_1+1$ to $32.x_1+x_2$, and via the control lines denoted by the encircled C, for the quantizers $32.x_1+x_2+1$ to $32.x_1+x_2+x_3$. The control signals arriving via the control lines A, B. C and D in FIG. 2 are generated in the parts of the encoding system shown in FIG. 1. The way how the bit allocation information for the composite subband 30 signals is generated will be explained later.

It should be noted that the quantizers 32.m in FIG. 2 need not be additional quantizers, in the sense that they are present in addition to the 2M quantizers $Q_{m1}$ and $Q_{mr}$ of FIG. 1. As will be understood from the foregoing, the quantizers 32.m are used in an intensity stereo mode. In this intensity stereo mode in a subband m, the composite subband signal, and not the original left and right hand subband signal component in that subband, is encoded. That means that the quantizers $Q_{m1}$ and $Q_{mr}$ need not quantize the original left and right hand subband signal components in that subband, so that one of them can be used as the quantizer 32.m. This can be realized by the appropriate switching of one of the two quantizers to the corresponding output of one of the signal combiners 25, 26 or 27.

Going back to FIG. 1, it will now be described how the bit allocation information $n_{mc}$ for a stereo intensity mode is derived. As has been said earlier, bit needs $b_{ll}$ to $b_{m1}$ and $b_{1r}$ to $b_{Mr}$ have been derived in the bit need determining means 16, in a way known in the prior art. Sometimes the bitpool, that is the total number of bits available for a fully separate encoding of the 2M subband signals, is insufficient. That means that carrying out a full stereo encoding will lead to a too rough quantization of one or more of the subband signals, which can lead to audible quantization noise upon decoding. In that situation, the subband signals in one or more of the subbands are combined so as to obtain a composite subband signal for each of said subbands.

An example of a calculation that can be carried out to identify whether the bitpool is insufficient to carry out a full stereo encoding, is as follows.

The bitneeds $b_{m1}$ and $b_{mr}$, as determined in the prior art publications (6a) and (6b) are relative figures on a dB scale and have a relation to the signal-to-mask ratio for the left and right hand signal component respectively. Dividing the bitneeds by 6 results in the number of bits needed to cover the signal range over the masking curve. Division by 6 is carried out, for the fact that each bit covers 6 dB. By adding all the 2M bit needs divided by 6 results in a value $B_1$ for the required number of bits for a full stereo encoding. This value can be compared to the bitpool B, which is the number of bits available for encoding. If $B_1$ exceeds B, there are insufficient bits to code the signal in a full stereo mode.

Going over to an intensity stereo mode in which the left and right hand subband signals in each of one or more subbands are combined as given above so as to obtain a composite subband signal in each said subbands can lead to a situation where the bitpool available is sufficient.

Now, the bitneed $b_{jc}$ must be derived for the composite subband signal for a subband with index j. As the bitneeds $b_{j1}$ and $b_{jr}$ for the original subband signals of that subband are available, it is decided to take $b_{jc}$ equal to a weighted sum of the values for $b_{j1}$ and $b_{jr}$. Otherwise said:

$$b_{jc}=c_1.b_{j1}+c_2.b_{jr},$$

where $c_1$ and $c_2$ are weighting factors. The weighting factor for the largest of the two values $b_{j1}$ and $b_{jr}$ can be taken larger than the weighting factor for the smaller of the two values. More specifically, the weighting factor for the largest of the two values $b_{j1}$ and $b_{jr}$ is equal to one, and the other weighting factor is zero. In that situation, $b_{jc}$ has been taken equal to the largest of the two bitneed values $b_{j1}$ and $b_{jr}$.

If intensity stereo encoding is to take place in one subband, we have $2M-7$ bitneeds $b_{m1}$ and $b_{mr}$ and one bitneed $b_{jc}$. Dividing the $2M-1$ bitneed values by 6, as previously explained and adding them, results in a lower value.

In the example of the embodiment of FIG. 2, it is decided that an intensity stereo mode can be carried out in which in the $x_1$ highest subbands the subband signals are combined so as to obtain $x_1$ composite signals. This results in $x_1$ values $b_{jc}$, where j runs from $M-x_1+1$ to M, one for each of the subbands with index $M-x_1+1$ to M. Dividing the $2M-x_1$ bitneeds by 6 and adding the results, offers a value $B_1$, which indicates the number of bits required for an encoding in which the separate subband signals in each of the $2M-x_1$ lower subbands and the composite subband signals in the $x_1$ highest subbands are encoded. If $B_1$ does not exceed B, such encoding is possible if other requirements are preferably also fulfilled.

Suppose that a decision is taken to carry out an intensity stereo encoding in the $x_1$ highest subbands. A first control signal is now generated by the means 16, which control signal is applied to the output 55. This control signal is applied to the input 56 of the means 7, as well as to the control signal input 33 of the signal combiner 25. The $x_1$ values $b_{jc}$ are supplied to $x_1$ outputs of the bit need determining means 16, denoted by the reference numeral 50, and are supplied to $x_1$ inputs of the bit allocation, means 7, denoted by the reference numeral 51, so as to enable a bit allocation leading to $M-x_1$ values for $n_{m1}$, $M-x_1$ values for $n_{mr}$ and $x_1$ values for $n_{jc}$, under the influence of the first control signal applied to the control signal input 56. Those $x_1$ values for $n_{jc}$ being applied to $x_1$ outputs of the bit allocation means 7, denoted by the reference numeral 52. Those $x_1$ $n_{jc}$ values are supplied via the $x_1$ signal lines indicated by the encircled A, to the quantizers 32.1 to 32.$x_1$ in FIG. 2. Further, the signal combiner 25 combines the subband signals in each of the $x_1$ highest subbands in response to the first control signal applied to its input 33, so as to obtain the $x_1$ composite subband signals, which are applied to the quantizers 32.1 to 32.$x_1$. As a results quantized composite subband signals are available at the outputs of those quantizers.

Figure 4A:
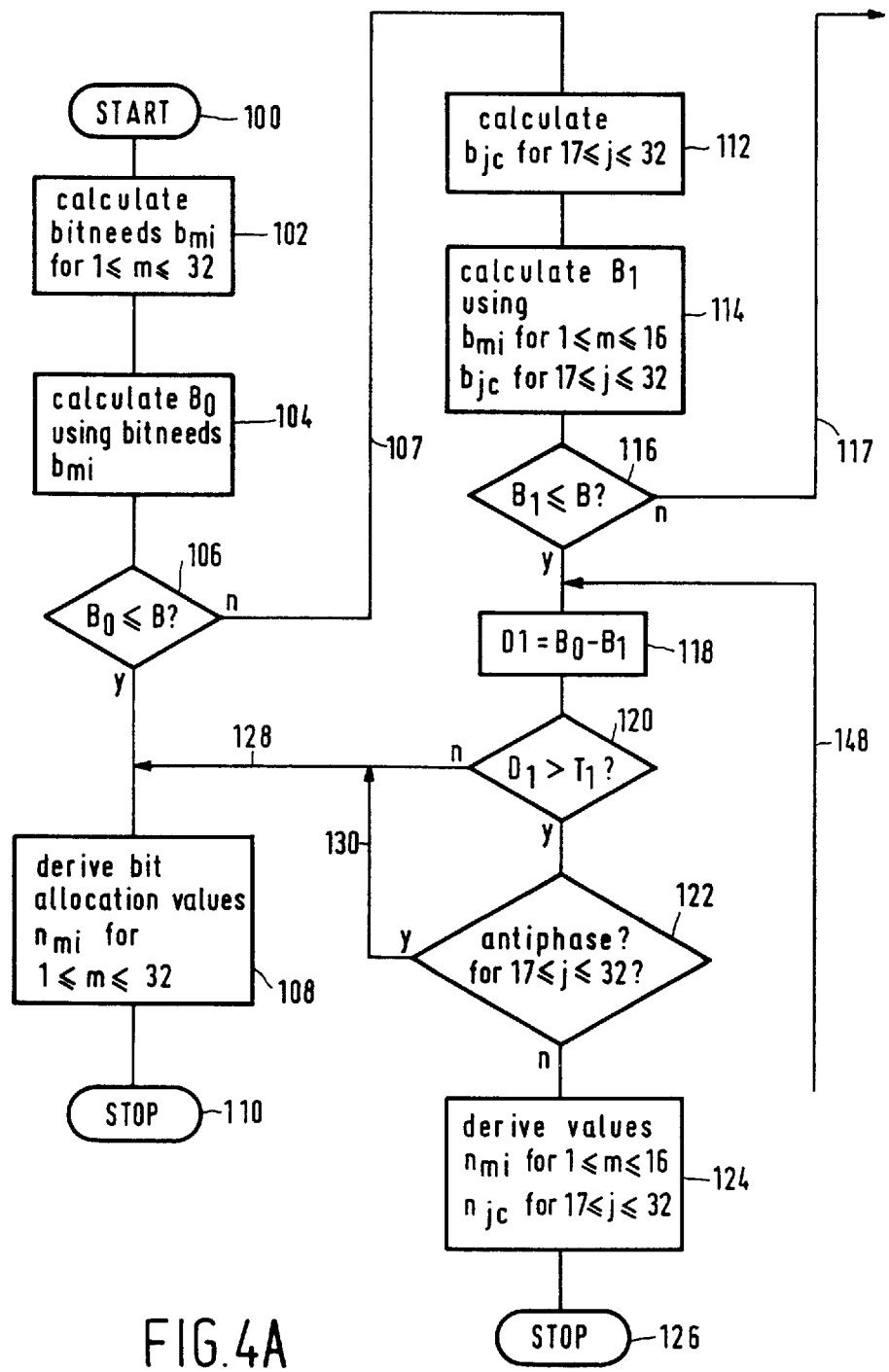
FIG. 4 shows a flow diagram of the operations of the encoding system of FIG. 1.
Figure 4B:
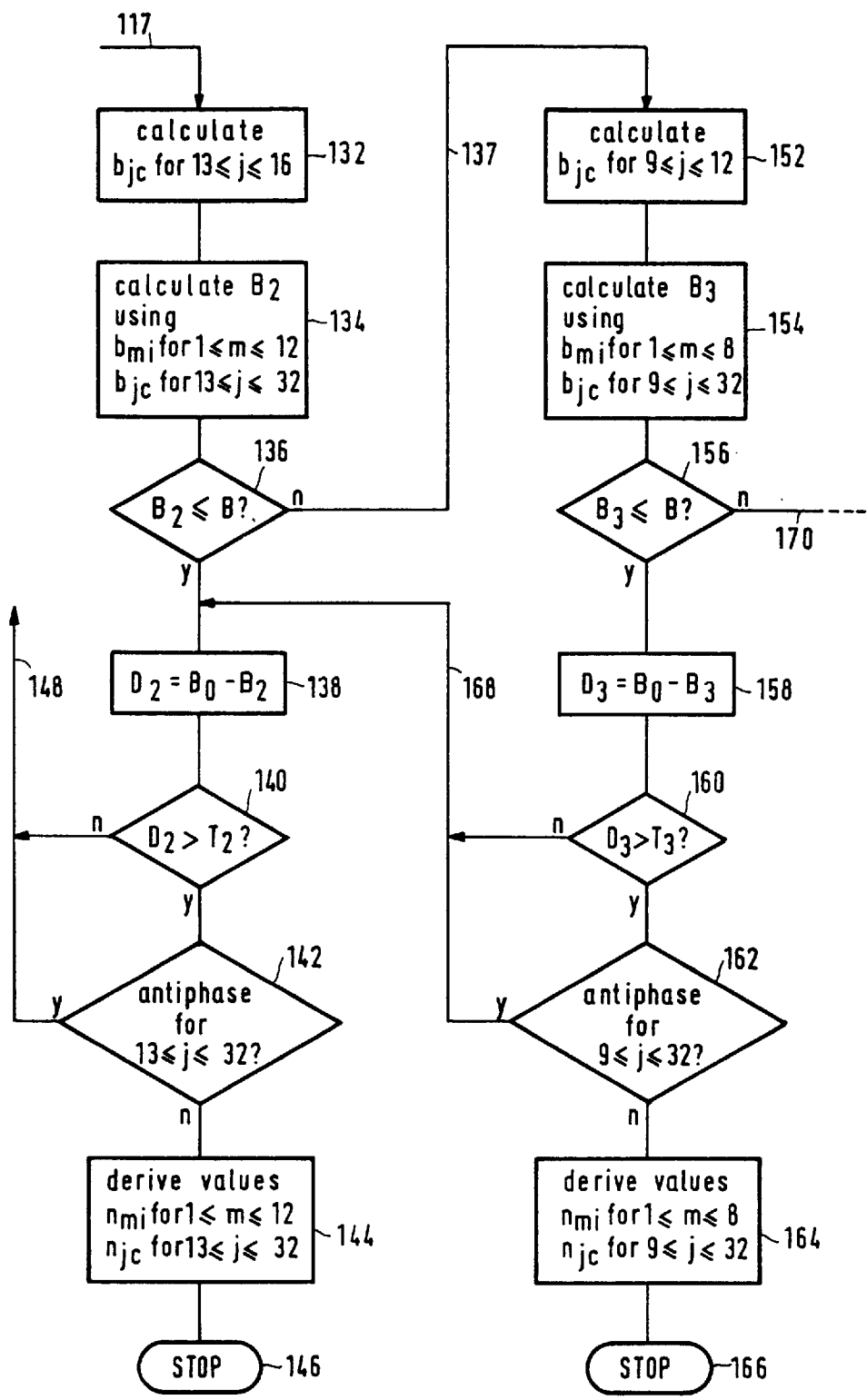

The further explanation will be done with reference to the flow diagram of FIG. 4. FIG. 4 shows a flow diagram, which starts in 100. The sequence that follows, is a sequence of steps that is carried out on a 'megablock' comprising one time equivalent block of each of the 2M subband signals. First, the 2M bit need values $b_{m1}$ and $b_{mr}$ are calculated. It is assumed here that M equals 32. That is: 32 values $b_{m1}$ and 32 values $b_{mr}$ are calculated in block 102. Next, in block 104, the value $B_1$ is calculated in the way explained above, namely, by dividing the 64 bitneed values by 6 and adding the results. The value $B_0$ is compared to B in block 106, and if $B_0$ appears to be smaller than or equal to B, a full stereo encoding can be carried out. This results in the derivation of 32 values for $n_{m1}$ and 32 values for $n_{mr}$ in the bit allocation means, see block 108. The process ends in block 10. This is followed by a full stereo encoding of the 2M subband signals in the 2M quantizers shown in FIG. 1.

If it is determined in block 106 that $B_0$ exceeds B, the process continues in block 112, in which the $b_{jc}$ values are calculated for the $x_1$, in this case the 16, highest subbands, in the way explained above. Next $B_1$ is calculated, being the number of bits required when separately encoding the subband signals in the 16 lowest subbands, and encoding the composite subband signals in the highest 16 subbands, see block 114. Next, a comparison is made between $B_1$ and B, block 116. If $B_1$ is smaller than or equal to B, the process continues in block 118, where the difference $D_1$ between $B_1$ and $B_0$ is determined, and in block 120 where it is determined whether the difference exceeds a certain threshold $T_1$. If not, it is decided that the 'profit' in number of bits is too low to justify an intensity stereo encoding, instead of a full stereo encoding. This for the reason that intensity stereo encoding can lead to artifacts that can become more annoying than an increased quantization noise in the case of full stereo encoding with a too low number of bits in the bitpool.

If it is decided that the gain in number of bits is too low, the process continues via the line 128 to block 108. If the gain exceeds the threshold $T_1$, the process continues to block 122, where it is determined whether an antiphase situation occurs in one of the subbands 17 to 32. An antiphase situation occurs if the left signal component in a subband has a polarity opposite to the polarity of the right signal component in that subband. If so, the process continues via the line 130 and 128 to block 108. This for the reason that intensity stereo encoding two subband signals in a subband that have opposite phase lead to larger artifacts in the reproduced signal than when the increased quantization noise in the case of a full stereo encoding with a too low number of bits in the bitpool.

A further feature of the block 122 (and all the other blocks to be discussed later, such as the blocks 142, 162 in FIG. 4 and the blocks 202, 222 and 242 in FIG. 5) can be that, if an antiphase situation exists in a subband but one of the at least two signal components in said subband lie below the masking threshold of the wideband digital signal, and thus is inaudible, one still can decide to carry out an intensity stereo encoding.

If no antiphase situation exists, the process continues to block 124, in which in the bit allocation step the 16 values for $n_{m1}$ and $n_{mr}$ for the 16 lowest subbands and the 16 values $n_{jc}$ for the 16 highest subbands are derived. The process ends in block 126. This is followed by an intensity stereo encoding on the subband signals, two in each of the 16 lowest subbands, and on the composite subband signals, one in each of the 16 highest subbands.

If it is determined in block 116 that $B_1$ exceeds B, the process continues in block 132, in which the $b_{jc}$ values are calculated for the $x_2$, in this case the 4, next lower subbands, in the way explained above. Next $B_2$ is calculated, being the number of bits required when separately encoding the subband signals in the 12 lowest subbands, and encoding the composite subband signals in the highest 20 subbands, see block 134. Next, a comparison is made between $B_2$ and B, block 136. If $B_2$ is smaller than or equal to B, the process continues in block 138, where the difference $D_2$ between $B_2$ and $B_0$ is determined, and in block 140 where it is determined whether the difference exceeds a certain threshold $T_2$. If not, it decided that the 'profit' in number of bits is too low to justify an intensity stereo encoding in the 20 highest subbands. This, again, for the reason that intensity stereo encoding in the 20 highest subbands can lead to artifacts that can become more annoying than an increased quantization noise in the case of an intensity stereo encoding in the 16 highest subbands or in the case of a full stereo encoding, both with a too low number of bits in the bitpool.

If it is decided that the gain in number of bits is too low, the process continues via the line 148 to block 118. If the gain exceeds the threshold $T_2$, the process continues to block 142, where it is determined whether an antiphase situation occurs in one of the subbands 13 to 32. If so, the process continues via the line 148 to block 118. This for the reason that intensity stereo encoding two subband signals in a subband that have opposite phase lead to larger artifacts in the reproduced signal than when the increased quantization noise in the case of an encoding with a too low number of bits in the bitpool.

If not, the process continues to block 144, in which in the bit allocation step the 12 values for $n_{m1}$ and $n_{mr}$ for the 12 lowest subbands and the 20 values $n_{jc}$ for the 20 highest subbands are derived. A second control signal is now generated, which is supplied to the output 55 of the bitneed determining means 16.

As regards the encoding system of FIGS. 1 and 2, this means that the bit determining means 16 supply the $x_1(=16)$ bitneeds $b_{jc}$ at the output 50 and the $x_2(=4)$ bitneeds $b_{jc}$ at an output 60. The $x_2$ bitneeds $b_{jc}$ are supplied to an input 61 of the bit allocation means 7. Further, $M-x_1-x_2$ ($=12$) values $b_{m1}$ and 12 values $b_{mr}$, for the 12 lowest subbands, are supplied to the bit allocation means 7. The allocation means 7 derive the 12 values $n_{m1}$, the 12 values $n_{mr}$ and the 20 values for $n_{jc}$ from the bitneed values received, and in response to the second control signal applied to its input 56. Further, the second control signal is applied via the lines denoted by the encircled D to the combining units 25 and 26, so that $x_1(=16)$ composite signals are generated by the combining unit 25 and the $x_2(=4)$ composite signals are generated by the combining unit 26, in response to the second control signal.

The $x_1(=16)$ values $n_{jc}$ derived for the highest subbands are supplied to the output 52 of the means 7, and the $x_2(=4)$ values $n_{jc}$ for the $x_2$ next lower subbands are supplied to an output 62 of the means 7. Those values are supplied via the lines denoted by the encircled A and B to the quantizers 32.1 to $32.x_1+x_2$, so that the quantization of the composite subband signals can be carried out.

If it is determined in block 136 that $B_2$ exceeds B, the process continues in block 152, in which the $b_{jc}$ values are calculated for the $x_3$, in this case the 4, next lower subbands, in the way explained above. Next $B_3$ is calculated, being the number of bits required when separately encoding the subband signals in the 8 lowest subbands, and encoding the composite subband signals in the highest 24 subbands, see block 154. Next, a comparison is made between $B_3$ and B, block 156. If $B_3$ is smaller than or equal to B, the process continues in block 158, where the difference $D_3$ between $B_3$ and $B_0$ is determined, and in block 160 where it is determined whether the difference exceeds a certain threshold $T_3$. If not, it decided that the 'profit' in number of bits is too low to justify an intensity stereo encoding in the 24 highest subbands. This, again, for the reason that intensity stereo encoding in the 24 highest subbands can lead to artifacts that can become more annoying than an increased quantization noise in the case of an intensity stereo encoding in the 20 highest subbands, the 16 highest subbands or when encoding in a full stereo mode, all with a too low number of bits in the bitpool.

If it is decided that the gain in number of bits is too low, the process continues via the line 168 to block 138. If the gain exceeds the threshold $T_3$, the process continues to block 162, where it is determined whether an antiphase situation occurs in one of the subbands 9 to 32. If so, the process continues via the line 168 to block 138.

If not, the process continues to block 164, in which in the bit allocation step the 8 values for $n_{m1}$ and $n_{mr}$ for the 8 lowest subbands and the 24 values $n_{jc}$ for the 24 highest subbands are derived. A third control signal is now generated, which is supplied to the output 55 of the bitneed determining means 16.

As regards the encoding system of FIGS. 1 and 2, this means that the bit determining means 16 supply the $x_1(=16)$ bitneeds $b_{jc}$ at the output 50 and the $x_2(=4)$ bitneeds $b_{jc}$ at the output 60 and the $x_3(=4)$ bitneeds $b_{jc}$ at an output 64. The $x_3$ bitneeds $b_{jc}$ are supplied to an input 65 of the bit allocation means 7. Further, $M-x_1-x_2-x_3$ ($=8$) values $b_{m1}$ and 8 values $b_{mr}$, for the 8 lowest subbands, are supplied to the bit allocation means 7. The allocation means 7 derive the 8 values $n_{m1}$, the 8 values $n_{mr}$ and the 24 values for $n_{jc}$ from the bitneed values received, and in response to the third control signal applied to its input 56. Further, the third control signal is applied via the lines denoted by the encircled D to the combining units 25, 26 and 27, so that $x_1$ ($=16$) composite signals are generated by the combining unit 25, the $x_2(=4)$ composite signals are generated by the combining unit 26, and the $x_3(=4)$ composite signal are generated by the combining unit 27, in response to the third control signal.

The $x_1(=16)$ values $n_{jc}$ derived for the highest subbands are supplied to the output 52 of the means 7, the $x_2(=4)$ values $n_{jc}$ for the $x_2$ next lower subbands are supplied to an output 62 of the means 7, and the $x_3(=4)$ values for $n_{jc}$ for the again next lower subbands are supplied to an output 67 of the means 7. Those values are supplied via the lines denoted by the encircled A, B and C to the quantizers 32.1 to $32.x_1+x_2+x_3$, so that the quantization of the composite subband signals can be carried out.

The process now ends in block 166. The process can be continued from block 156 via line 170, if $B_3$ exceeds B. If there is no further signal path for a further increase of the number of subbands in which an intensity stereo encoding can be carried out, the block 156 can be left out.

The method described in FIG. 4 can have some of the blocks at other locations in the flow diagram, without leading to a different overall functioning. As an example, the block 122 for determining the antiphase situation, can be located in the branch 107 coupling the 'no' output of the block 106 with the block 112. In this situation, when having decided that $B_0$ is larger than B, it is decided whether an antiphase situation exists in one or more of the 16 highest subbands. If so, the method proceeds to block 108. Otherwise, the method proceeds to block 112. In the same way, the block 142 can be located in the branch 117 coupling the 'no' output of the block 116 with the block 132, and the block 162 can be located in the branch 137 coupling the 'no' output of the block 136 with the block 152.

Further, it should be noted that, in more simple methods, not all the requirements shown in FIG. 4 are needed. As an example, if the requirement that the 'profit' in number of bits should exceed a certain threshold value, such as the values $T_1$, $T_2$ and $T_3$, is not relevant, this leads to a method, such as the method of FIG. 4, in which the blocks 118, 120, 138, 140, 158 and 160 have been left out.

Figure 3:
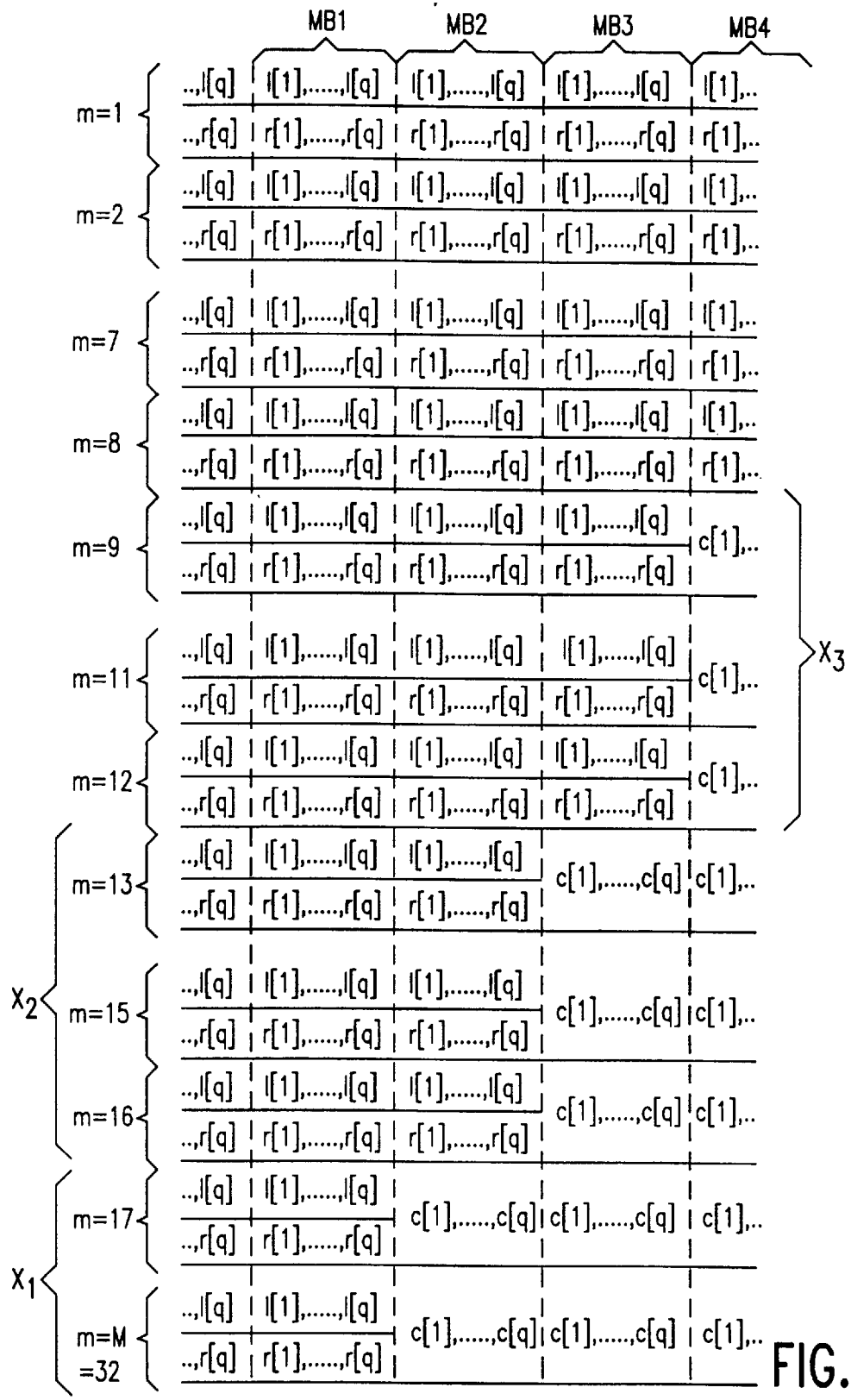
FIG. 3 shows subsequent time equivalent signal blocks when encoding the digital signal in an intensity stereo mode.

FIG. 3 shows the encoding of subsequent 'macroblocks' of time equivalent signal blocks of the subband signals. FIG. 3 shows, indicated by MB1, a macroblock in which a full stereo encoding is carried out. That is: all $2M(=64)$ subband signals are present for encoding. MB2 is a macroblock for which has been decided that an encoding in an intensity stereo mode on the highest $x_1(=16)$ subbands will be carried out. That means that for the lowest $M-x_1(=16)$ subbands the separate subband signals are present, whereas in the highest subbands, for m=16 to m=32, a composite subband signal, having samples $c[1], c[2], \ldots, c[q]$, is available. The next macroblock MB3 shows a composite signal in the 20 highest subbands, whereas the macroblock MB4 (only a part of the macroblock is shown) shows a composite signal in the 24 highest subbands.

Figure 5A:
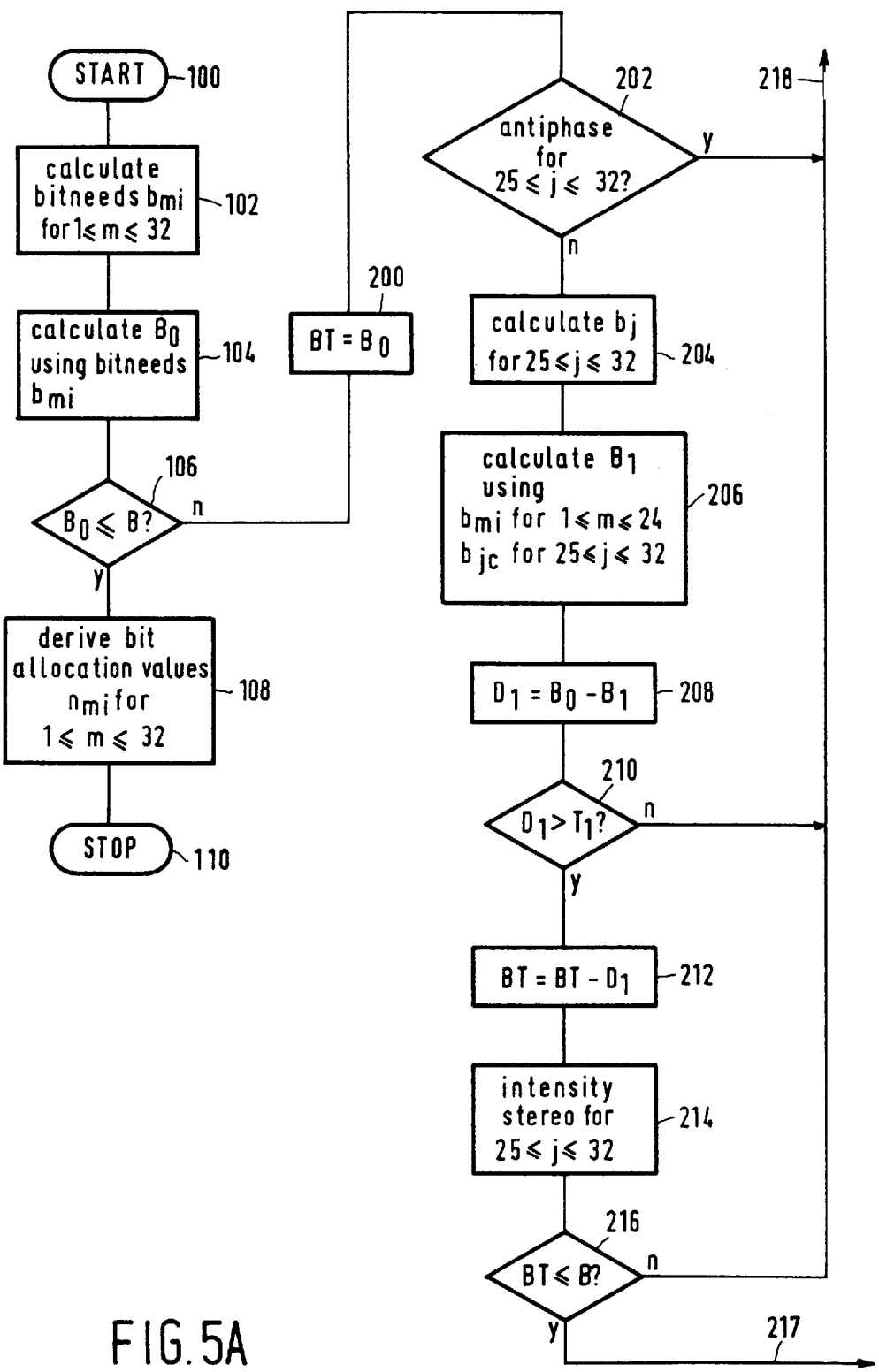
FIG. 5 shows another flow diagram of the operations of the encoding system of FIG. 1.
Figure 5B:
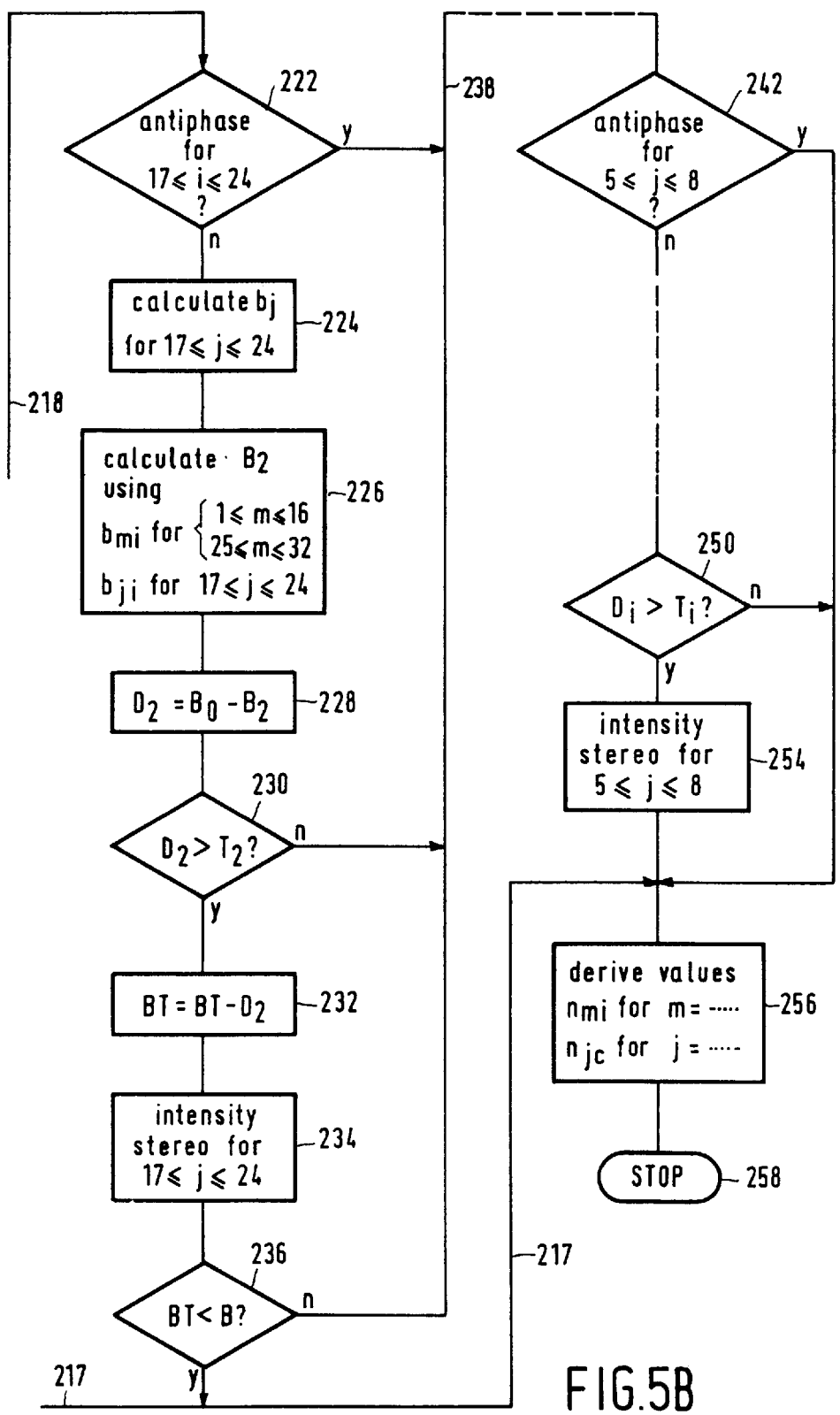

FIG. 5 shows another embodiment of a method for encoding a digital signal in an intensity stereo encoding mode.

The method starts in block 100 and continues via the blocks 102, 104 and 106, in the same way as shown in FIG. 4. The branch including the decision process that leads to a full stereo encoding via the blocks 108 and 110, is fully equivalent to the branch including the same blocks in FIG. 4.

If $B_0$ is larger than B, the program continues via block 200, in which a value BT is made equal to $B_0$, to block 202. In this block 202 it is determined whether an antiphase situation exists in one or more of the (in this case) eight highest subbands. If not, the program proceeds to block 204 in which the values $b_{jc}$ for the eight highest subbands are calculated. Next, the required number of bits $B_1$, when encoding the 24 lowest subbands in a full stereo mode and the 8 highest subbands in an intensity stereo mode, is calculated in block 206, using $b_{mi}$ for $1 \leq m \leq 24$ and $b_{jc}$ for $25 \leq j \leq 32$. In block 208, the difference $D_1$ between $B_0$ and $B_1$ is calculated.

In block 210 it is determined whether $D_1$ is larger than a first threshold value $T_1$. If so, it is decided that a intensity stereo mode coding will be carried out in the eight highest subbands, block 214. Moreover, in block 212 the value BT is replaced by the original value for BT from which the difference value $D_1$ has been subtracted, and it is determined in block 216 whether BT is smaller than or equal to B. If so, the program continues via the path 217 to block 256, in which the values $n_{m1}$ are determined for $1 \leq m \leq 24$ and the values $n_{jc}$ are determined for $25 \leq j \leq 32$. As a result, an intensity stereo mode encoding is carried out in the eight highest subbands.

In the case that it is decided in block 202 that an antiphase situation is present, the program continues via the path 218 to block 222. In the same way if $D_1$ is not larger than $T_1$, see block 210, the program continues via the path 218 to block 222. In both cases, no intensity stereo mode encoding will take place in the eight highest subbands. Further, if BT appears to be larger than B in block 216, the program also continues via the path 218 to block 222. In this situation, however, it has been decided, in block 214, to carry out an intensity stereo mode encoding in at least the eight highest, subbands.

In block 222 it is determined whether an antiphase situation exists in one or more of the (in this case) eight next lower subbands, for which it holds that $17 \leq j \leq 24$. If not, the program proceeds to block 224 in which the values $b_{jc}$ for the eight next lower subbands are calculated. Next, the required number of bits $B_2$, when encoding the subbands m, with $1 \leq m \leq 16$ and $25 \leq m \leq 32$, in a full stereo mode and the subbands j, with $17 \leq j \leq 24$, in an intensity stereo mode, is calculated in block 226, using $b_{mi}$ for $1 \leq m \leq 16$ and $25 \leq m \leq 32$ and $b_{jc}$ for $17 \leq j \leq 24$.

In block 228, the difference $D_2$ between $B_0$ and $B_2$ is calculated.

In block 230 it is determined whether $D_2$ is larger than a first threshold value $T_2$. If so, it is decided that a intensity stereo mode coding will be carried out in the eight next lower subbands, block 234. Moreover, in block 232 the value BT is replaced by the present value for BT from which the difference value $D_2$ has been subtracted, and it is determined in block 236 whether BT is smaller than or equal to B. If so, the program continues via the path 217 to block 256, in which the values $n_{mi}$ are determined for $1 \leq m \leq 16$, the values $n_{jc}$ are determined for $17 \leq j \leq 24$. Further, if the program has avoided the block 214, a full stereo encoding will be carried out in the eight highest subbands, so that also the values $n_{mi}$ are calculated for $25 \leq m \leq 32$. If the program has passed the block 214, an intensity stereo mode encoding will be carried out in the 16 highest subbands, so that in the block 256 also the values $n_{jc}$ for $25 \leq j \leq 32$ are calculated. As a result, an intensity stereo mode encoding is carried out in either the eight next higher subbands or in the 16 highest subbands.

In the case that it is decided in block 222 that an antiphase situation is present, the program continues via the path 238 to a branch (not shown), such as the branch including the blocks 222 to 236. In the same way if $D_2$ is not larger than $T_2$, see block 230, the program continues via the path 238 to the said branch. In both cases, no intensity stereo mode encoding will take place in the eight next lower subbands. Further, if BT appears to be larger than B in block 236, the program also continues via the path 238 to the said branch. In this situation, however, it has been decided, in block 234, to carry out an intensity stereo mode encoding in at least the eight next lower subbands.

In the said branch, for a number of next lower subbands it is decided whether an intensity stereo mode encoding should take place. The processing is fully equivalent to the two branches already discussed above.

FIG. 5 shows the last, or i-th, branch which starts with the block 242, which is equivalent to the block 222. Blocks equivalent to the blocks 224, 226 and 228 are also present in the last branch. In block 242 it is decide whether an antiphase situation exists in one or more of the subbands 5 to 8. If so, the program proceeds to block 256 and no intensity stereo mode encoding is carried out in the subbands 5 to 8. In block 250 it is determined whether $D_i$, relating to the difference between $B_0$ and $B_i$ is larger than $T_i$. If not, again no intensity stereo mode encoding is carried out in the subbands 5 to 8. If so, the program proceeds to block 254 and 256, resulting in an intensity stereo mode encoding in at least the subbands 5 to 8.

In the embodiments discussed hereinbefore it has been assumed that in all cases it was a matter of coding a wideband digital signal constituted by first and second signal components, for example a stereo signal constituted by a left and a right signal component. The wideband digital signal, however, may also be constituted by three or more signal components. With three signal components one may think of a left, a centre and a right component. With four signal components one may think of, for example, a left, centre, right and surround signal. With five signal components, one may think of a left, centre, right, left surround and right surround signal.

References (1) European Patent Application No. 289 080 (PHN 12.108)

(2) European Patent Application No. 402 973 (PHN 13.241)

(3) European Patent Application No. 497,413 (PHN 13.581)

(4) IEEE ICASSP 80, Vol. 1, 327–331, Apr. 9–11, 1980 M. A. Krasner "The Critical Band Coder . . . Digital Encoding of Speech Signals Based on the Perceptual Requirements of the Auditory System".

(5) European Patent Application No. 400,755 (PHQ 89.018A)

(6a) European Patent Application No. 457,390 (PHN 13.328)

(6b) European Patent Application No. 457,391 (PHN 13.329)

(7) Proc. of the ICASSP, 1991, Toronto, pp. 3601–4, R. G. van der Waal et al, 'Subband coding of stereophonic digital audio signals'.

I claim:

1. An encoding system for encoding a digital signal having at least a first and a second digital signal component, the signal components having a specific sampling frequency and bandwidth, comprising splitter means for dividing the bandwidth of the digital signal components into M successive frequency bands, and generating in response to the digital signal components M sub signals for each digital signal component, each sub signal of a signal component being associated with one of the frequency bands, bit need determining means for determining bit needs for time equivalent signal blocks of the sub signals, the signal blocks each containing q samples of a sub signal, a bit need $b_{mi}$ for a signal block of a sub signal $SB_{mi}$ of a signal component i in frequency band m corresponding to the number of bits by which the q samples in that signal block should be represented, where $b_{mi}$ may vary for different signal blocks and different sub signals, signal combination means for combining, in a number of at least one frequency bands, time equivalent signal blocks of corresponding sub signals of the at least first and second signal component so as to obtain a time equivalent signal block of a composite sub signal in each said at least one frequency bands, quantizing means for quantizing time equivalent signal blocks of the sub signals in those frequency bands in which no composite sub signal is available and for quantizing the corresponding time equivalent signal blocks of the composite sub signal in said at least one frequency band in which a composite sub signal is available, each sample of the signal block of a sub signal $SB_{mi}$ being quantized by $n_{mi}$ bits, where m denotes a frequency band in which no composite sub signal is available, and each sample of the composite sub signal $SB_{mc}$ being quantized by $n_{mc}$ bits, where m denotes a frequency band in which a composite sub signal is available, bit allocation means for deriving the variables $n_{mi}$ and $n_{mc}$ from bit needs obtained in the bit need determining means and from a value B, where B corresponds to a number of bits in an available bitpool, and wherein q is an integer larger than zero, $n_{mi}$, $n_{mc}$, $b_{mi}$, $b_{mc}$ are variables where $n_{mi}$ and $n_{mc}$ are greater than or equal to zero, M is a constant greater than zero, B is an integer, and m is an integer such that $1 \leq m \leq M$, characterized in that the bit need determining means is adapted to determine a common bit need $b_{mc}$ for a time equivalent signal block of a composite sub signal $SB_{mc}$ in a frequency band m from the bit needs $b_{mi}$ of the time equivalent signal blocks of the corresponding sub signals of the at least two signal components in that frequency band from which the time equivalent signal block of the composite sub signal has been derived, such that common bit need $b_{mc}$ is equal to the sum of the bit needs $b_{mi}$, multiplied by a corresponding weighting factor, the bit allocation means being adapted to derive the variables $n_{mi}$ for the time equivalent signal blocks of the sub signals in those frequency bands in which no composite sub signal is available and the at least one variable $n_{mc}$ for the time equivalent signal block of the sub signal in those at least one frequency band for which a composite sub signal is available, from the bit needs $b_{mi}$ available for those frequency bands for which no composite sub signal is available and the at least one common bit need $b_{mc}$.

2. Encoding system as claimed in claim 1, characterized in that the weighting factor corresponding to the largest of the bitneeds $b_{mi}$ is larger than the weighting factor corresponding to the other at least one bitneed.

3. Encoding system as claimed in claim 2, characterized in that the weighting factor corresponding to the largest of the bitneeds $b_{mi}$ is equal to one and the other at least one weighting factor is zero.

4. The encoding system of claim 1, characterized in that it comprises computation means for computing a value $B_0$, where $B_0$ corresponds to the number of bits required when separately encoding the time equivalent signal blocks of the at least first and second sub signals in all M frequency bands, comparing means for comparing the value $B_0$ with the value B, the comparing means being adapted to generate a first control signal at an output when $B_0$ exceeds B, combining control signal generator means for generating a first combining control signal in response to at least the occurrence of the first control signal, the signal combination means being adapted to combine in a number of $x_1$ frequency bands, time equivalent signal blocks of corresponding sub signals of the at least first and second signal component in said $x_1$ frequency bands so as to obtain a time equivalent signal block of a composite sub signal in each said $x_1$ frequency bands, in response to said first combining control signal, the bit allocation means being adapted to derive variables $n_{jc}$ for the time equivalent signal blocks of the composite sub signals in said $x_1$ frequency bands, in response to the first combining control signal, where j denotes one of the $x_1$ frequency bands, the quantizing means being adapted to quantize the time equivalent signal blocks of the composite sub signals in said $x_1$ frequency bands by $n_{jc}$ bits, in response to the first combining control signal, and where $x_1$ is an integer larger than zero.

5. The encoding system as claimed in claim 4, characterized in that, in response to the occurrence of the first control signal, the computation means are further adapted to compute a value $B_1$, where $B_1$ corresponds to the number of bits required when encoding corresponding time equivalent signal blocks of composite sub signals in said $x_1$ frequency bands and separately encoding the corresponding time equivalent signal blocks of the at least first and second sub signals in the remaining M–$x_1$ frequency bands, the comparing means being further adapted to compare the value $B_1$ with the value B, the comparing means being adapted to generate a second control signal when $B_1$ does not exceed B.

6. The encoding system as claimed in claim 5, characterized in that the combining control signal generator means being further adapted to generate said first combining control signal in response to at least the occurrence of the first and second control signal.

7. The encoding system as claimed in claim 4, characterized in that the computation means further being adapted to determine the difference $D_1$ between $B_0$ and $B_1$, the comparing means being adapted to compare the difference $D_1$ with a first threshold value $T_1$, the comparing means being adapted to generate a third control signal when the difference $D_1$ exceeds the first threshold value, the combining control signal generator means being further adapted to generate said first combining control signal in response to at least the occurrence of the first and third control signal.

8. The encoding system as claimed in claim 4, characterized in that the encoding system further comprises antiphase determining means for determining an antiphase situation between the corresponding time equivalent signal blocks in at least one of said $x_1$ frequency bands and for determining a fourth control signal in the absence of an antiphase situation in at least one of the $x_1$ subbands, the combining control signal generator means being further adapted to generate said first combining control signal in response to at least the occurrence of the first and fourth control signal.

9. The encoding system as claimed in claim 6, characterized in that the combining control signal generator means being further adapted to generate said first combining control signal in response to at least the occurrence of the first, second and third control signal.

10. The encoding system as claimed in claim 6, characterized in that the combining control signal generator means being further adapted to generate said first combining control signal in response to at least the occurrence of the first, second and fourth control signal.

11. The encoding system as claimed in claim 7, characterized in that the combining control signal generator means being further adapted to generate said first combining control signal in response to at least the occurrence of the first, third and fourth control signal.

12. The encoding system as claimed in claim 6, characterized in that the first combining control signal generator means being further adapted to generate said first combining control signal in response to the occurrence of the first, second, third and fourth control signal.

13. The encoding system as claimed in claim 4, characterized in that the $x_1$ frequency bands are the $x_1$ highest frequency bands of the M frequency bands.

14. The encoding system as claimed in claim 5, characterized in that in response to a second combining control signal the signal combination means is further adapted to combine, in a number of $x_2$ frequency bands, time equivalent signal blocks of corresponding sub signals of the at least first and second signal component in said $x_2$ frequency bands so as to obtain a time equivalent signal block of a composite sub signal in each said $x_2$ frequency bands, the bit allocation means being adapted to derive variables $n_{jc}$ for the time equivalent signal blocks of the composite sub signals in said $x_2$ frequency bands, in response to the second combining control signal, where j denotes one of the $x_2$ frequency bands, the quantizing means being adapted to quantize the time equivalent signal blocks of the composite sub signals in said $x_2$ frequency bands by $n_{jc}$ bits, in response to the second combining control signal, that the combining control signal generator means being further adapted to generate said second combining control signal in response to at least the detection of the absence of the second control signal, where $x_2$ is an integer larger than zero.

15. The encoding system as claimed in claim 7, characterized in that in response to a second combining control signal the signal combination means is further adapted to combine, in a number of $x_2$ frequency bands, time equivalent signal blocks of corresponding sub signals of the at least first and second signal component in said $x_2$ frequency bands so as to obtain a time equivalent signal block of a composite sub signal in each said $x_2$ frequency bands, the bit allocation means being adapted to derive variables $n_{jc}$ for the time equivalent signal blocks of the composite sub signals in said $x_2$ frequency bands, in response to the second combining control signal, where j denotes one of the $x_2$ frequency bands, the quantizing means being adapted to quantize the time equivalent signal blocks of the composite sub signals in said $x_2$ frequency bands by $n_{jc}$ bits, in response to the second combining control signal, that the combining control signal generator means being further adapted to generate said second combining control signal in response to at least the detection of the absence of the third control signal, where $x_2$ is an integer larger than zero.

16. The encoding system as claimed in claim 8, characterized in that in response to a second combining control signal the signal combination means is further adapted to combine, in a number of $x_2$ frequency bands, time equivalent signal blocks of corresponding sub signals of the at least first and second signal component in said $x_2$ frequency bands so as to obtain a time equivalent signal block of a composite sub signal in each said $x_2$ frequency bands, the bit allocation means being adapted to derive variables $n_{jc}$ for the time equivalent signal blocks of the composite sub signals in said $x_2$ frequency bands, in response to the second combining control signal, where j denotes one of the $x_2$ frequency bands, the quantizing means being adapted to quantize the time equivalent signal blocks of the composite sub signals in said $x_2$ frequency bands by $n_{jc}$ bits, in response to the second combining control signal, that the combining control signal generator means being further adapted to generate said second combining control signal in response to at least the detection of the absence of the fourth control signal, where $x_2$ is an integer larger than zero.

17. The encoding system as claimed in claim 14, characterized in that the computation means are further adapted to compute a value $B_2$, where $B_2$ corresponds to the number of bits required when encoding corresponding time equivalent signal blocks of composite sub signals in said number of $x_2$ frequency bands and separately encoding the corresponding time equivalent signal blocks of the at least first and second sub signals in the remaining M–$x_2$ frequency bands.

18. The encoding system as claimed in claim 17, characterized in that the comparing means being further adapted to compare the value $B_2$ with the value B, the comparing means being adapted to generate a fifth control signal when $B_2$ does not exceed B.

19. The encoding system as claimed in claim 18, characterized in that the combining control signal generating means is further adapted to generate the second combining control signal only if also the presence of the fifth control signal has been detected.

20. The encoding system as claimed in claim 17, characterized in that the computation means further being adapted to determine the difference $D_2$ between $B_0$ and $B_2$, the comparing means being adapted to compare the difference $D_2$ with a second threshold value $T_2$, the comparing means being adapted to generate a sixth control signal when the difference $D_2$ exceeds the second threshold value, the combining control signal generator means being further adapted to generate said second combining control signal only if also the presence of the sixth control signal has been detected.

21. The encoding system as claimed in claim 14, characterized in that the antiphase determining means are further adapted to determining an antiphase situation between the corresponding time equivalent signal blocks in at least one of said $x_2$ frequency bands and for determining a seventh control signal in the absence of an antiphase situation in at least one of the $x_2$ subbands, the combining control signal generator means being further adapted to generate said second combining control signal if also the presence of the seventh control signal has been detected.

22. The encoding system as claimed in claim 20, characterized in that the second threshold value $T_2$ which is larger than the first threshold value $T_1$.

23. The encoding system as claimed in claim 14, characterized in that the $x_2$ subbands are the next lower $x_2$ subbands.

24. An encoding method for encoding a digital signal having at least a first and a second digital signal component, the signal components having a specific sampling frequency and bandwidth, in which the bandwidth of the digital signal components are splitted into M successive frequency bands, and M sub signals are generated for each digital signal component in response to the digital signal components, each sub signal of a signal component being associated with one of the frequency bands, bit needs for time equivalent signal blocks of the sub signals are determined, the signal blocks each containing q samples of a sub signal, a bit need $b_{mi}$ for a signal block of a sub signal $SB_{mi}$ of a signal component i in frequency band m corresponding to the number of bits by which the q samples in that signal block should be represented, where $b_{mi}$ may vary for different signal blocks and different sub signals, time equivalent signal blocks of corresponding sub signals of the at least first and second signal component in a number of at least one frequency band may be combined so as to obtain a time equivalent signal block of a composite sub signal in each said at least one frequency bands, time equivalent signal blocks of the sub signals in those frequency bands in which no composite sub signal is available are quantized and the corresponding time equivalent signal blocks of the composite sub signal in said at least one frequency band in which a composite sub signal is available are quantized, each sample of the signal block of a sub signal $SB_{mi}$ being quantized by $n_{mi}$ bits, where m denotes a frequency band in which no composite sub signal is available, and each sample of the composite sub signal $SB_{mc}$ being quantized by $n_{mc}$ bits, where m denotes a frequency band in which a composite sub signal is available, the variables $n_{mi}$ and $n_{mc}$ are derived from bit needs obtained and from a value B, where B corresponds to a number of bits in an available bitpool, and wherein q is an integer larger than zero, $n_{mi}$, $n_{mc}$, $b_{mi}$, $b_{mc}$ are variables where $n_{mi}$ and $n_{mc}$ are greater than or equal to zero. M is a constant greater than zero, B is an integer, and m is an integer such that $1 \leq m \leq M$, characterized in that a common bit need $b_{mc}$ for a time equivalent signal block of a composite sub signal $SB_{mc}$ in a frequency band m is determined from the bit needs $b_{mi}$ of the time equivalent signal blocks of the corresponding sub signals of the at least two signal components in that frequency band from which the time equivalent signal block of the composite sub signal has been derived, by taking the common bit need $b_{mc}$ equal to the sum of the bit needs $b_{mi}$, multiplied by a corresponding weighting factor, and that the variables $n_{mi}$ for the time equivalent signal blocks of the sub signals in those frequency bands in which no composite sub signal is available and the at least one variable $n_{mc}$ for the time equivalent signal block of the sub signal in those at least one frequency band for which a composite sub signal is available, are derived from the bit needs $b_{mi}$ available for those frequency bands for which no composite sub signal is available and the at least one common bit need $b_{mc}$.

25. Encoding method as claimed in claim 24, characterized in that the weighting factor corresponding to the largest of the bitneeds $b_{mi}$ is taken larger than the weighting factor corresponding to the other at least one bitneed.

26. Encoding method as claimed in claim 25, characterized in that the weighting factor corresponding to the largest of the bitneeds $b_{mi}$ is taken equal to one and the other at least one weighting factor is taken equal to zero.

27. The encoding method of claim 24, characterized in that a value $B_0$ is computed, where $B_0$ corresponds to the number of bits required when separately encoding the time equivalent signal blocks of the at least first and second sub signals in all M frequency bands, the value $B_0$ is compared with the value B and a first control signal is generated when $B_0$ exceeds B, a first combining control signal is generated in response to at least the occurrence of the first control signal, that, in response to the occurrence of the first combining control signal, in a number of $x_1$ frequency bands, time equivalent signal blocks of corresponding sub signals of the at least first and second signal component in said $x_1$ frequency bands are combined so as to obtain a time equivalent signal block of a composite sub signal in each said $x_1$ frequency bands, variables $n_{jc}$ for the time equivalent signal blocks of the composite sub signals in said $x_1$ frequency bands are generated, where j denotes one of the $x_1$ frequency bands, the time equivalent signal blocks of the composite sub signals in said $x_1$ frequency bands are quantized by $n_{jc}$ bits, and where $x_1$ is an integer larger than zero.

28. The encoding method as claimed in claim 27, characterized in that, in response to the occurrence of the first control signal, a value $B_1$ is computed, where $B_1$ corresponds to the number of bits required when encoding corresponding time equivalent signal blocks of composite sub signals in said $x_1$ frequency bands and separately encoding the corresponding time equivalent signal blocks of the at least first and second sub signals in the remaining M–$x_1$ frequency bands, the value $B_1$ is compared with the value B and a second control signal is generated when $B_1$ does not exceed B.

29. The encoding method as claimed in claim 28, characterized in that said first combining control signal is generated in response to at least the occurrence of the first and second control signal.

30. The encoding method as claimed in claim 27, characterized in that the difference $D_1$ between $B_0$ and $B_1$ is determined, the difference $D_1$ is compared with a first threshold value $T_1$ and a third control signal is generated when the difference $D_1$ exceeds the first threshold value, and that said first combining control signal is generated in response to at least the occurrence of the first and third control signal.

31. The encoding method as claimed in claim 27, characterized in that an antiphase situation is determined between the corresponding time equivalent signal blocks in at least one of said $x_1$ frequency bands and a fourth control signal is generated in the absence of an antiphase situation in at least one of the $x_1$ subbands, and that said first combining control signal is generated in response to at least the occurrence of the first and fourth control signal.

32. The encoding method as claimed in claim 30, characterized in that said first combining control signal is generated in response to at least the occurrence of the first, second and third control signal.

33. The encoding method as claimed in claim 31, characterized in that said first combining control signal is generated in response to at least the occurrence of the first, second and fourth control signal.

34. The encoding method as claimed in claim 30, characterized in that said first combining control signal is generated in response to at least the occurrence of the first, third and fourth control signal.

35. The encoding method as claimed in claim 30, characterized in that said first combining control signal is generated in response to the occurrence of the first, second, third and fourth control signal.

36. The encoding method as claimed in claim 28, characterized in that in response to a second combining control signal, in a number of $x_2$ frequency bands, time equivalent signal blocks of corresponding sub signals of the at least first and second signal component in said $x_2$ frequency bands are combined so as to obtain a time equivalent signal block of a composite sub signal in each said $x_2$ frequency bands, variables $n_{jc}$ for the time equivalent signal blocks of the composite sub signals in said $x_2$ frequency bands are derived, where j denotes one of the $x_2$ frequency bands, the time equivalent signal blocks of the composite sub signals in said $x_2$ frequency bands are quantized by $n_{jc}$ bits, and that said second combining control signal is generated in response to at least the detection of the absence of the second control signal, where $x_2$ is an integer larger than zero.

37. The encoding method as claimed in claim 30, characterized in that in response to a second combining control signal, in a number of $x_2$ frequency bands, time equivalent signal blocks of corresponding sub signals of the at least first and second signal component in said $x_2$ frequency bands are combined so as to obtain a time equivalent signal block of a composite sub signal in each said $x_2$ frequency bands, variables $n_{jc}$ for the time equivalent signal blocks of the composite sub signals in said $x_2$ frequency bands are derived, where j denotes one of the $x_2$ frequency bands, the time equivalent signal blocks of the composite sub signals in said $x_2$ frequency bands are quantized by $n_{jc}$ bits, and that said second combining control signal is generated in response to at least the detection of the absence of the third control signal, where $x_2$ is an integer larger than zero.

38. The encoding method as claimed in claim 31, characterized in that in response to a second combining control signal, in a number of $x_2$ frequency bands, time equivalent signal blocks of corresponding sub signals of the at least first and second signal component in said $x_2$ frequency bands are combined so as to obtain a time equivalent signal block of a composite sub signal in each said $x_2$ frequency bands, variables $n_{jc}$ for the time equivalent signal blocks of the composite sub signals in said $x_2$ frequency bands are derived, where j denotes one of the $x_2$ frequency bands, the time equivalent signal blocks of the composite sub signals in said $x_2$ frequency bands are quantized by $n_{jc}$ bits, and that said second combining control signal is generated in response to at least the detection of the absence of the fourth control signal, where $x_2$ is an integer larger than zero.

39. The encoding method as claimed in claim 36, characterized in that a value $B_2$ is computed, where $B_2$ corresponds to the number of bits required when encoding corresponding time equivalent signal blocks of composite sub signals in said number of $x_2$ frequency bands and separately encoding the corresponding time equivalent signal blocks of the at least first and second sub signals in the remaining $M-x_2$ frequency bands.

40. The encoding method as claimed in claim 39, characterized in that the value $B_2$ is compared with the value B, and that a fifth control signal is generated when $B_2$ does not exceed B.

41. The encoding method as claimed in claim 40, characterized in that the second combining control signal is generated only if also the presence of the fifth control signal has been detected.

42. The encoding method as claimed in claim 39, characterized in that the difference $D_2$ between $B_0$ and $B_2$ is determined, the difference $D_2$ is compared with a second threshold value $T_2$, a sixth control signal is generated when the difference $D_2$ exceeds the second threshold value, and that said second combining control signal is generated only if also the presence of the sixth control signal has been detected.

43. The encoding method as claimed in claim 36, characterized in that an antiphase situation is determined between the corresponding time equivalent signal blocks in at least one of said $x_2$ frequency bands and that a seventh control signal is generated in the absence of an antiphase situation in at least one of the $x_2$ subbands, and that said second combining control signal is generated if also the presence of the seventh control signal has been detected.

* * * * *